US011949367B2

(12) United States Patent
Atchley et al.

(10) Patent No.: US 11,949,367 B2
(45) Date of Patent: Apr. 2, 2024

(54) SOLAR MODULE SYSTEM FOR METAL SHINGLED ROOF

(71) Applicant: THE R&D LAB COMPANY, Petaluma, CA (US)

(72) Inventors: Brian Atchley, Petaluma, CA (US); Kyle Tripp, Sacramento, CA (US); Ian Crecelius, Portland, OR (US)

(73) Assignee: THE R&D LAB COMPANY, Petaluma, CA (US)

(*) Notice: Subject to any disclaimer, the term of this patent is extended or adjusted under 35 U.S.C. 154(b) by 114 days.

(21) Appl. No.: 17/538,952

(22) Filed: Nov. 30, 2021

(65) Prior Publication Data

US 2022/0173691 A1 Jun. 2, 2022

Related U.S. Application Data

(63) Continuation-in-part of application No. 17/393,959, filed on Aug. 4, 2021, now Pat. No. 11,742,792.

(60) Provisional application No. 63/150,819, filed on Feb. 18, 2021, provisional application No. 63/119,741, filed on Dec. 1, 2020.

(51) Int. Cl.
H02S 20/25 (2014.01)
H02S 20/23 (2014.01)
H02S 30/10 (2014.01)

(52) U.S. Cl.
CPC ............ *H02S 20/23* (2014.12); *H02S 30/10* (2014.12)

(58) Field of Classification Search
CPC ......... Y02E 10/50; Y02E 10/47; Y02B 10/10; H02S 20/23; H02S 20/25; H02S 30/10; H02S 40/36; E04D 1/30; E04D 2001/308; E04D 1/2942; E04D 1/18; E04D 1/2918
See application file for complete search history.

(56) References Cited

U.S. PATENT DOCUMENTS

| 1,496,336 | A | * | 6/1924 | Ennis | E04D 1/20 52/530 |
| 1,643,445 | A | * | 9/1927 | Call | E04D 1/2942 52/530 |
| 3,269,075 | A | * | 8/1966 | Cosden | E04D 1/06 52/302.1 |
| 5,442,888 | A | * | 8/1995 | Ilnyckyj | E04D 1/28 52/527 |
| 5,613,337 | A | * | 3/1997 | Plath | E04D 1/18 52/529 |

(Continued)

OTHER PUBLICATIONS

International Searching Authority, International Search Report and Written Opinion for corresponding International Application No. PCT/US2021/061270, dated Feb. 10, 2022, 10 pages.

*Primary Examiner* — Brian E Glessner
*Assistant Examiner* — Daniel J Kenny
(74) *Attorney, Agent, or Firm* — David R. Heckadon; Gordon Rees Scully Mansukhani LLP

(57) ABSTRACT

A solar power system for a metal shingled roof, including: a plurality of metal roofing shingles; and a plurality of solar module mounting assemblies, wherein each of the solar module mounting assemblies has upper and lower module cleats that support upper and lower solar module frames thereon such that the upper and lower module frames are both spaced apart in a direction parallel to the roof, and spaced apart in a direction perpendicular to the roof.

25 Claims, 45 Drawing Sheets

(56) References Cited

U.S. PATENT DOCUMENTS

| | | | | |
|---|---|---|---|---|
| 5,711,127 | A | * | 1/1998 | Sabourin ............... E04D 1/2942 52/545 |
| 8,590,223 | B2 | * | 11/2013 | Kilgore ................. H02S 20/10 52/173.3 |
| 8,839,573 | B2 | * | 9/2014 | Cusson ................. H02S 20/10 52/173.3 |
| 9,035,176 | B2 | * | 5/2015 | Keller ................... H02S 20/00 439/97 |
| 9,518,596 | B2 | * | 12/2016 | West .................... F16B 5/0004 |
| 10,640,980 | B2 | * | 5/2020 | Haddock ................ E04D 3/362 |
| 10,852,038 | B2 | * | 12/2020 | Rothschild ............ H02S 30/10 |
| 2007/0111581 | A1 | | 5/2007 | Ressler |
| 2009/0044854 | A1 | * | 2/2009 | Placer ................... H02S 20/23 52/173.3 |
| 2010/0275974 | A1 | | 11/2010 | Chan et al. |
| 2011/0209422 | A1 | | 9/2011 | King et al. |
| 2012/0017972 | A1 | | 1/2012 | Jenkins et al. |
| 2012/0304559 | A1 | * | 12/2012 | Ishida ................... H02S 20/23 52/173.3 |
| 2013/0212959 | A1 | | 8/2013 | Lopez |
| 2016/0164453 | A1 | * | 6/2016 | Cropper ............... H01L 31/044 136/251 |
| 2017/0328602 | A1 | | 11/2017 | Miyamoto et al. |
| 2020/0263905 | A1 | | 8/2020 | Daniels |
| 2021/0317662 | A1 | * | 10/2021 | Svec .................... E04D 1/2942 |

* cited by examiner

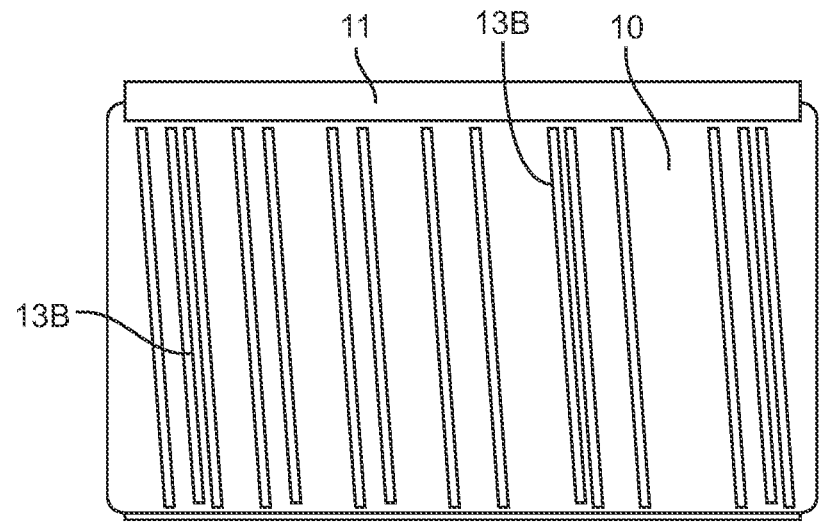
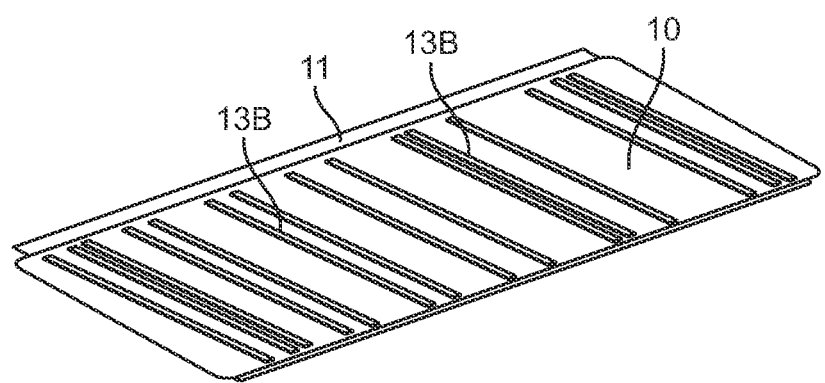
FIG. 8B

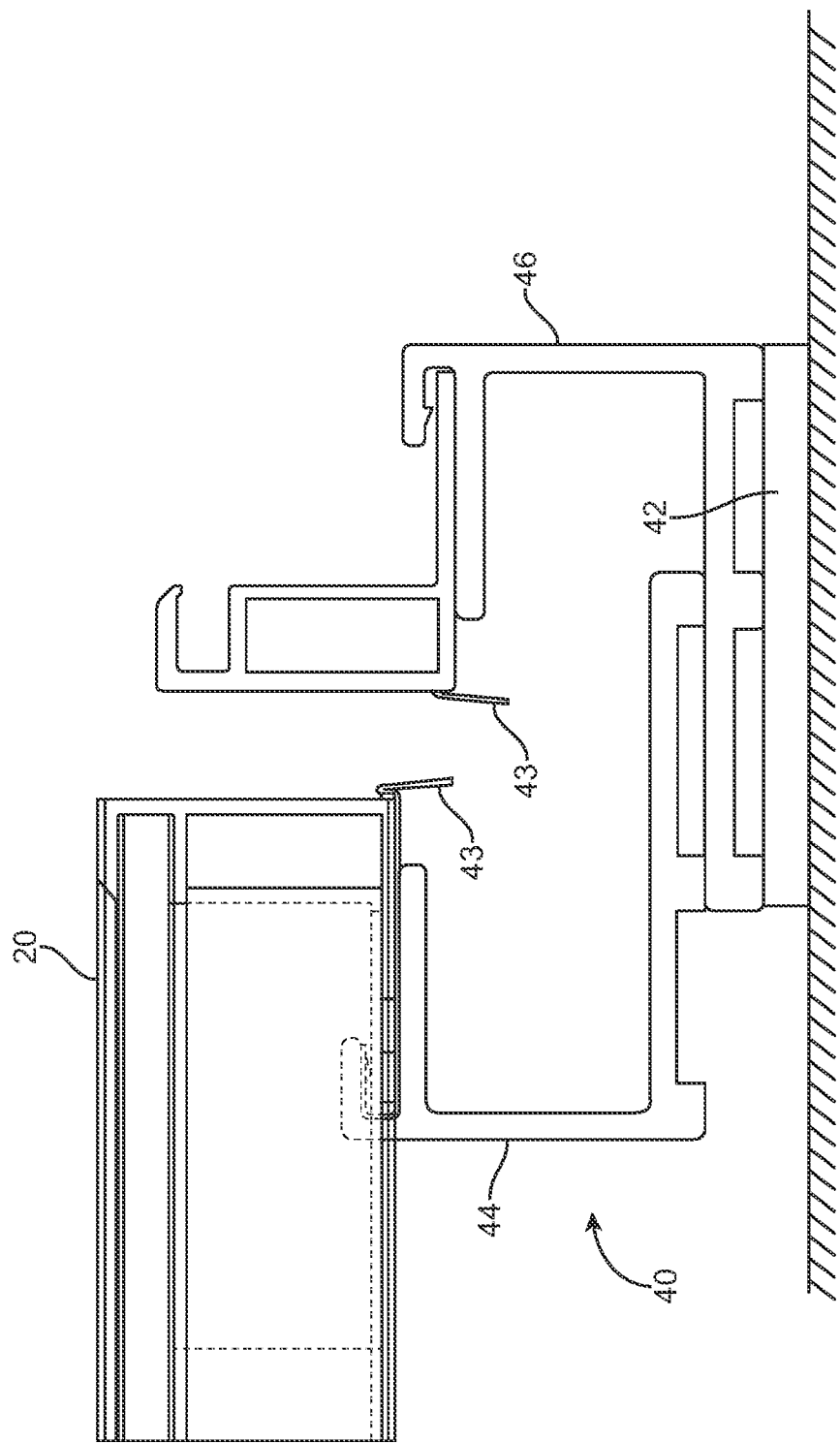

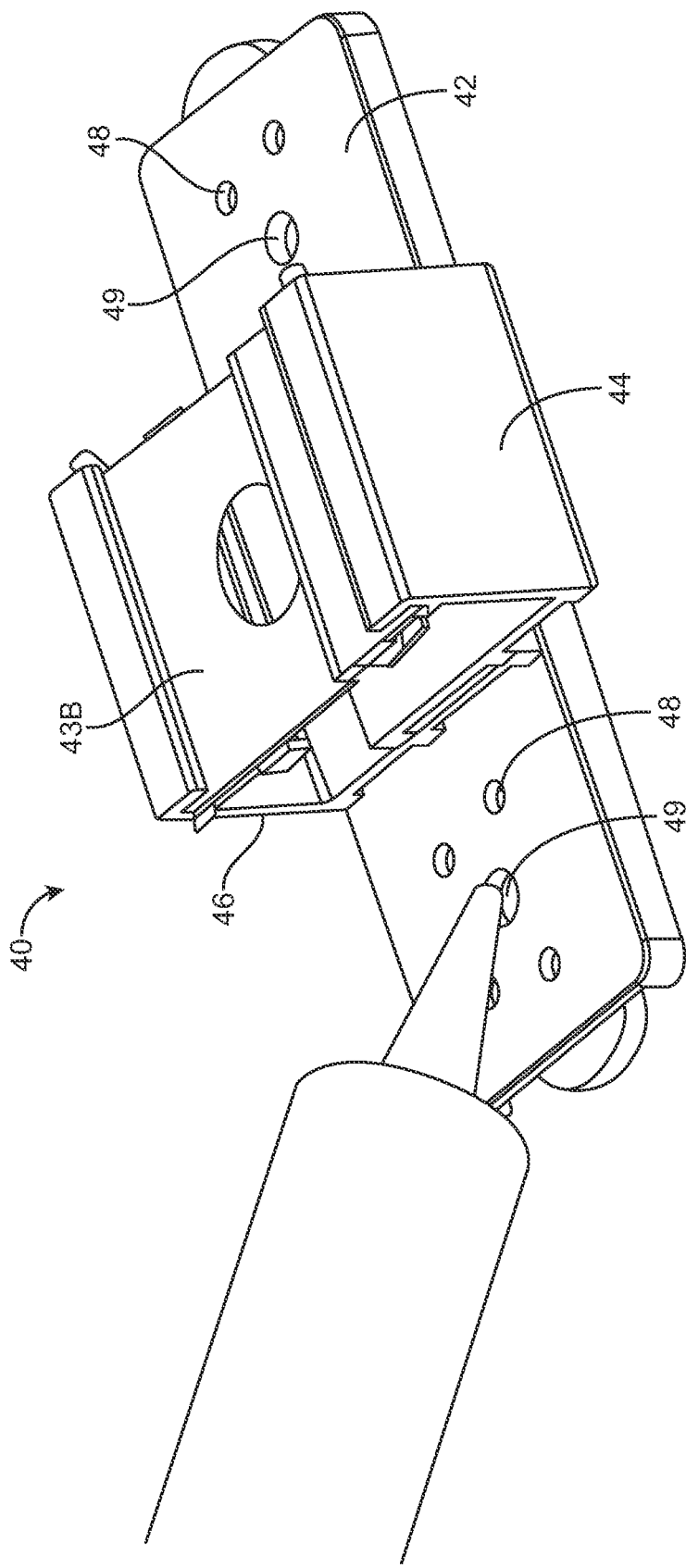

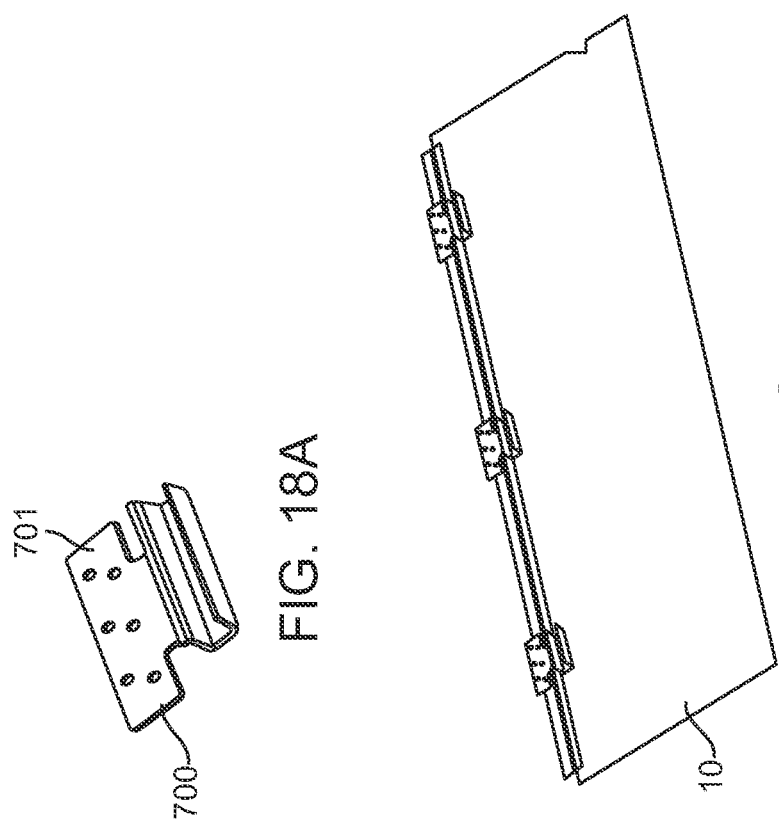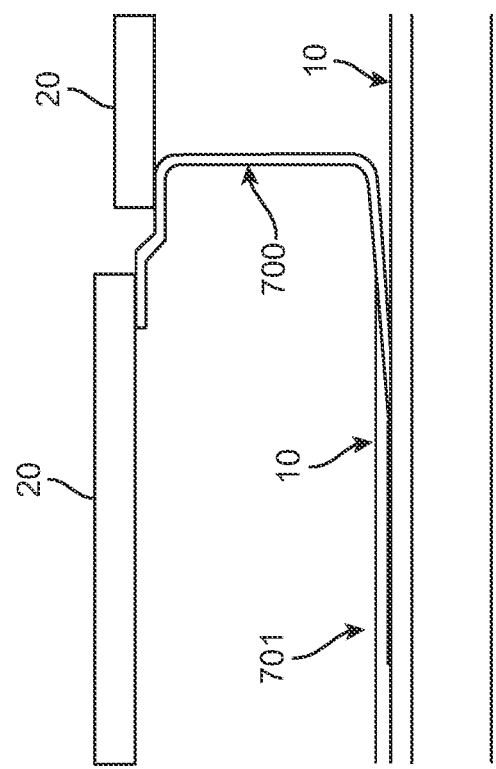

SOLAR MODULE SYSTEM FOR METAL SHINGLED ROOF

PRIORITY APPLICATIONS

This application is a Continuation-In-Part of U.S. Utility patent application Ser. No. 17/393,959, entitled Solar Module System For Metal Shingled Roof, filed Aug. 4, 2021, which claims priority to U.S. Provisional Patent Application 63/119,741 entitled Optimizing And Integrating Roofing And Solar For Labor, Cost, Safety, Aesthetics And Rapid Scaling, filed Dec. 1, 2020 and to U.S. Provisional Patent Application 63/150,819 entitled Solar Integrated Roofing, filed Feb. 18, 2021; the entire disclosures of which are incorporated herein by reference in their entireties for all purposes.

TECHNICAL FIELD

The present application relates to systems for mounting solar modules on metal shingled roofs in particular and other roofs types in general.

BACKGROUND OF THE INVENTION

Various mounting approaches currently exist for placing solar modules onto metal shingled roofs. Unfortunately, it has been quite difficult to quickly and easily determine the optimal positioning for the solar module mounts (which then support the solar modules thereon). Other common problems include accommodating thermal expansion and contraction of the modules, grounding both the metal shingles and the solar module frames, and preventing water intrusion between the shingles. Surface irregularities in the roof have also made it difficult to lay out aesthetically pleasing solar arrays.

What is instead needed is a system that facilitates quick and easy placement of the solar mounting system onto the metal shingled roof. As will be shown, the present system provides an elegant solution to this problem, and to the other problems stated above.

SUMMARY OF THE INVENTION

The present system provides an integrated approach to quickly and easily mount solar panels onto a metal shingled roof. Preferred advantages of the present system may include any or all of the following:

(a) the metal roofing shingles are both dimensioned and marked with index marks such that they can be used to position the layout of the solar mounting assemblies thereon permitting a rapid and easy system assembly on the roof. (As such, the shingle positions act as templates for the solar module positions);

(b) the markings on the metal roofing shingles can be used to quickly and easily guide and align the position of successive overlapping metal shingle rows thereover;

(c) the metal roofing shingles are grounded to one another in both up and down directions on the roof and in lateral directions across the roof;

(d) the solar modules are grounded to one another in both in up and down directions on the roof and in lateral directions across the roof;

(e) each of the solar module frames can freely thermally expand and contract without any of the solar module frames pushing or pulling on one another;

(f) successive solar modules appear to slightly overlap one another in the up and down direction on the roof thus providing a very aesthetically pleasing system that is well designed to hide surface irregularities in the roof itself;

(g) the metal shingles can be made with capillary breaks therein (either by forming lines into the shingles or by corrugating the shingles) thus substantially reducing the problem of water intrusion;

(h) the solar modules can be installed very quickly as each mounting assembly simultaneously holds both an upper and a lower solar module frame thereon;

(i) the solar module frames can be installed quickly using a single tool positioned at the mounting assembly between the upper and lower solar module frames; and (j) the various retention clips provided to secure the solar module frame to the mounting assemblies also provide grounding of one solar module frame to another.

(k) the metal shingles can be installed very quickly as the sidelaps do not require sliding in the lateral direction to fit together;

(l) the metal shingles can be installed from either the left or right side as the sidelaps do not require sliding in the lateral direction to fit together; and (m) the solar module mounting is conducted from the top of the roof down to the bottom placing the functional elements in an ergonomically preferred location between the operator's knees and chest.

In one preferred aspect, the present system provides a solar power system for a metal shingled roof, comprising:
a plurality of metal roofing shingles; and
a plurality of solar module mounting assemblies that are configured to be deck-mounted through the metal roofing shingles into a roof (or alternatively mounted to the shingles themselves without being deck mounted), wherein each of the solar module mounting assemblies comprises:
a base,
an upper module cleat mounted onto the base, the upper module cleat being configured to support a lower end of an upper solar module frame, and
a lower module cleat mounted onto the base, the lower module cleat being configured to support an upper end of a lower solar module frame, and
wherein the upper and lower module cleat are configured to support the upper and lower solar module frames such that the upper and lower module frames are:
spaced apart in a direction parallel to the roof, and
spaced apart in a direction perpendicular to the roof.

Preferably, the metal roofing shingles are sized to be integer divisions of the size of the solar module frames. For example, the metal roofing shingles can be sized to be ½ the width and ½ the height of the solar module frames to quickly facilitate module placement as will be shown herein. By correlating the size of the shingles to the size of the solar module frames, the present metal roofing shingles can be indexed to display locations for the positioning of the bases of the solar module mounting assemblies thereon. In addition, the shingles can be marked or indexed to display locations for setting adjacent rows of overlapping shingles thereover. As such, each shingle can provide a template for positioning another shingle and the shingles also can provide a template for positioning the solar module frames thereon.

In preferred aspects, the mounting assemblies each comprise upper and lower module cleats that permit expansion and contraction of the upper and lower module frames in up and down directions along the slope of the roof. In addition, both of the upper and lower module cleats can be attached to the base of the solar module mounting assemblies by a single fastener that passes through a gap between the upper and lower module frames, thereby making system service, disassembly and reassembly fast and easy.

In preferred aspects, adjacent metal roofing shingles are electrically bonded to one another both in up and down directions along the slope of the roof, and laterally across the roof. This approach facilitates the use of GFCI (Ground Fault Circuit Interrupters) which operate to switch off the circuit, thus ensuring that any fault in the photovoltaic array can be shorted to the grounded shingle layer. Such an emergency shutdown system operates to protect emergency workers like firefighters.

In preferred aspects, the metal roofing shingles are non-planar such that drainage pathways form therebetween when the metal roofing shingles overlap one another. For example, the metal roofing shingles can be corrugated or have stamped lines formed therein.

BRIEF DESCRIPTION OF THE DRAWINGS

FIG. 8B is a top and perspective view of an alternate metal shingle having stamped straight lines formed therein for providing capillary breaks for use with the present system.

FIG. 9B is a view corresponding to FIG. 9A, with one of the solar modules removed showing further details of its frame.

FIG. 9G is a perspective view showing sealant added to the mounting assembly of FIG. 9D.

FIG. 18A is a perspective view of an alternate "under the shingle" mounting fastener.

FIG. 18B is a perspective view of the mounting fastener of FIG. 18A attached to a metal shingle.

FIG. 18C is a side elevation view of the system of FIGS. 18A and 18B.

DETAILED DESCRIPTION OF THE DRAWINGS

Figure 1A:
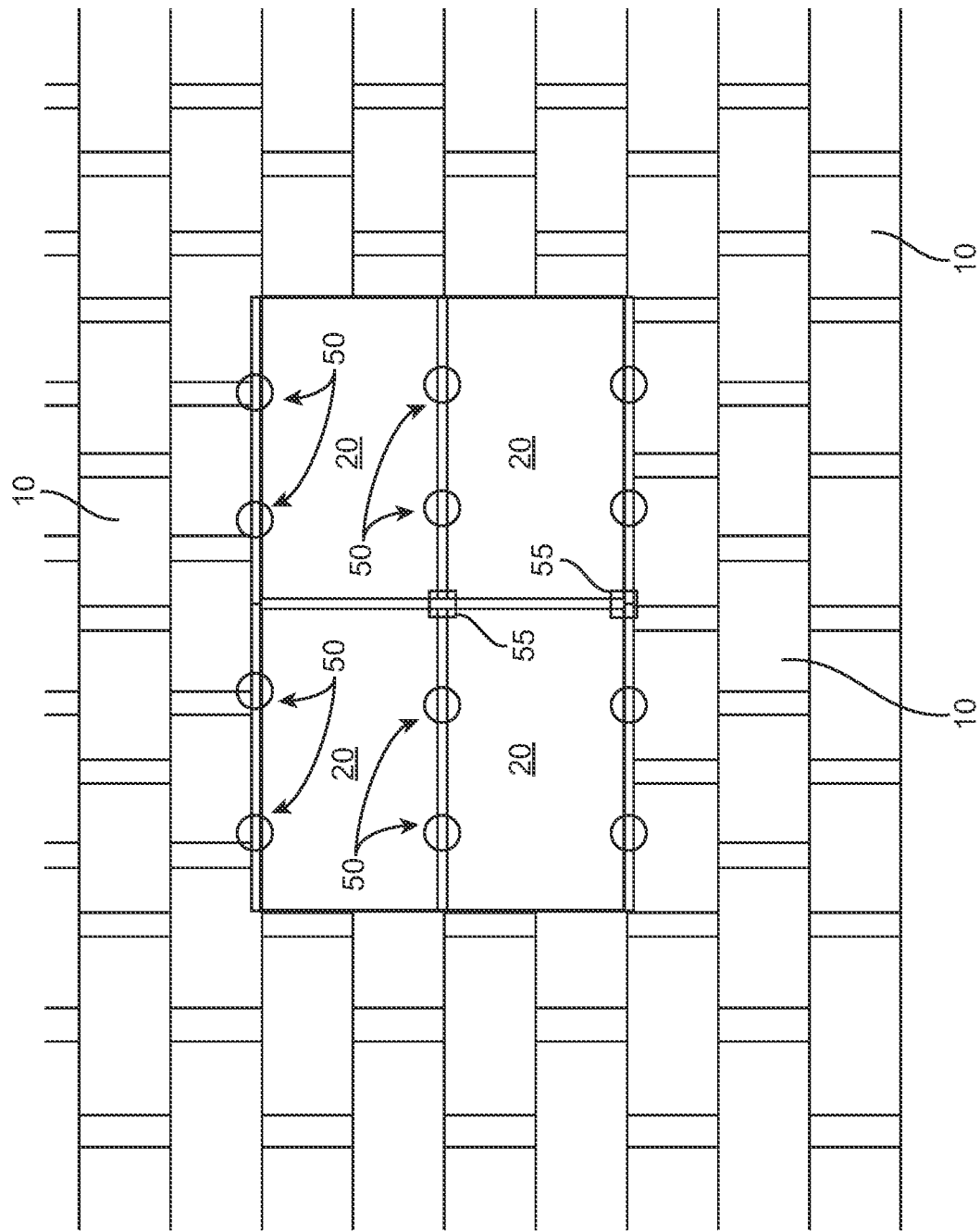
FIG. 1A is a plan view of the solar modules mounted onto a metal shingled roof, as viewed in a direction normal to the roof surface.
Figure 1B:
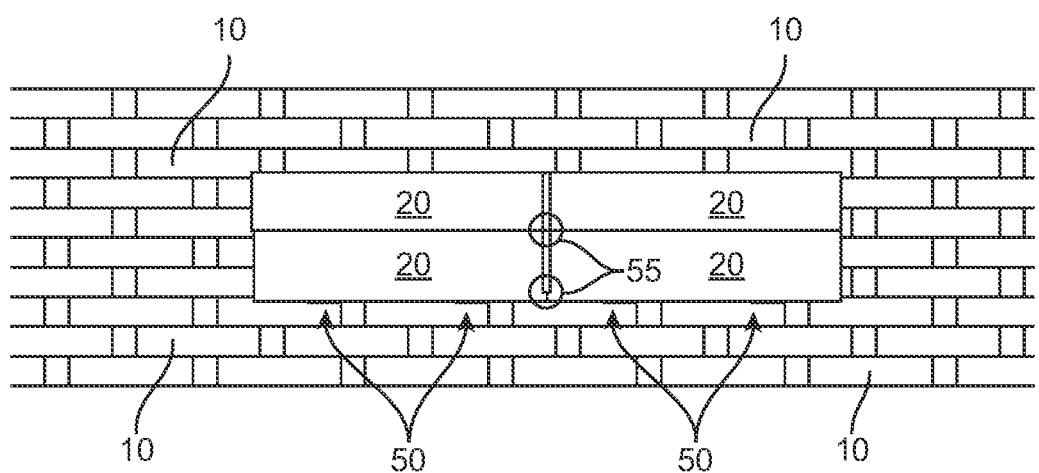
FIG. 1B is a front elevation view corresponding to FIG. 1A, as viewed in a horizontal direction parallel to the ground.
Figure 2:
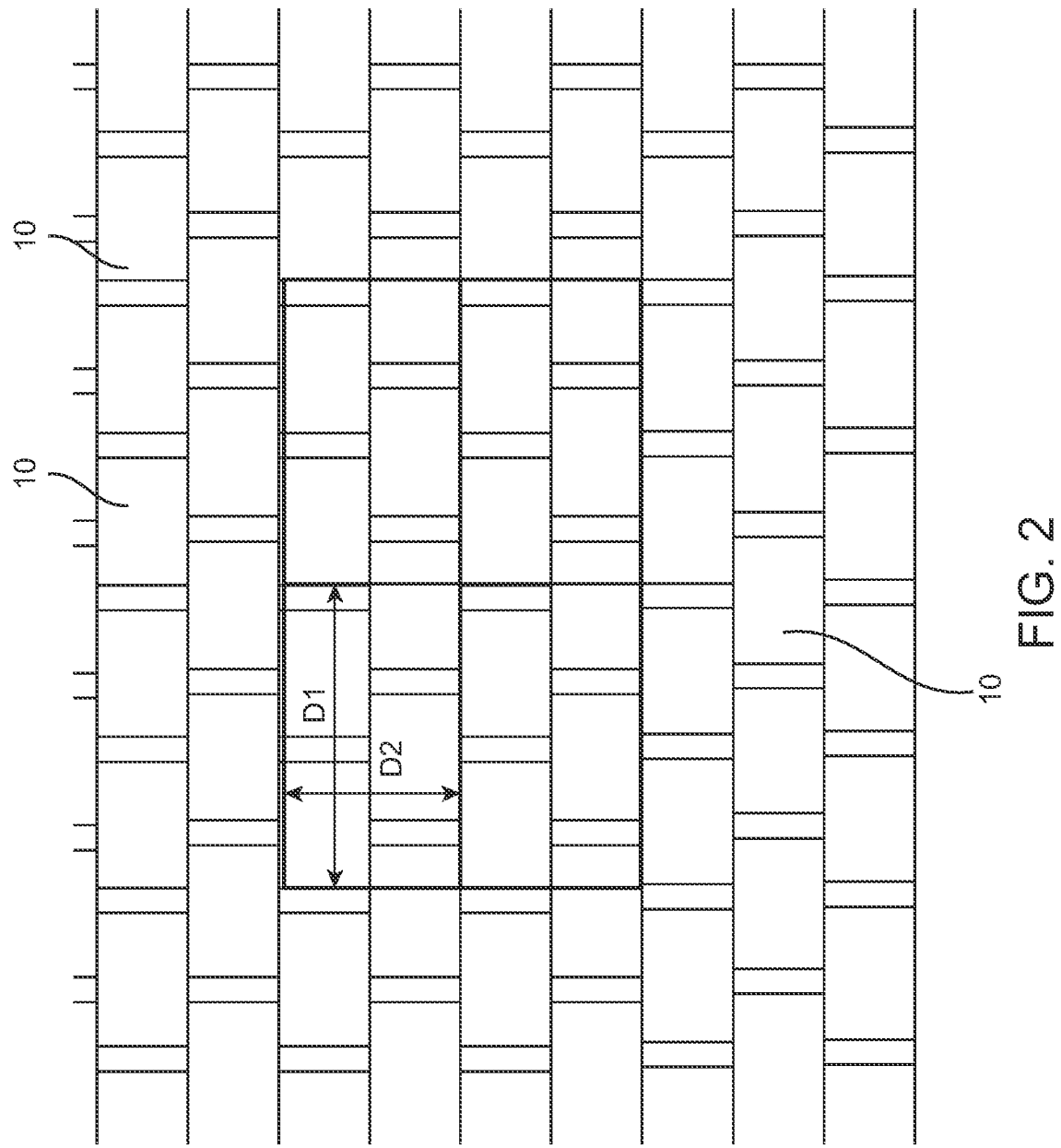
FIG. 2 is a view corresponding to FIGS. 1A and 1B, but with the solar modules and mounting assemblies removed, showing how the positioning of the solar modules is determined by the position of the metal shingles.

FIGS. 1A and 1B are views of the solar modules mounted onto a metal shingled roof, and FIG. 2 is a similar view but with the solar modules and mounting assemblies removed, showing how the positioning of the solar modules is determined by the position of the metal shingles.

Specifically, a roof of a building is covered by successive rows of metal shingles 10. As is standard with all shingles, the shingles are first placed down onto the roof with successive shingle rows overlapping one another. As is also standard, shingle placement is done from the bottom to the top of a slanted roof. Specifically, a first row of shingles is laid down extending laterally across the bottom edge of the roof. A second row of shingles is then laid down thereover with the bottom edges of the second row on top of the top edges of the first row. This procedure is then carried out as successive shingle rows are laid down with the workers eventually reaching the top edge of the roof.

Once the roofing shingles are in place, then solar module frames 20 are mounted to the roof on top of the shingles. Again, this is a common procedure, and the solar module frames 20 are typically installed with the workers working down from the top of the roof to the bottom of the roof. The method of having the solar modules 20 installed from the top to the bottom of the roof is ergonomically preferred since it affords the installers the opportunity to secure the modules and do wire management at a location between the installers' feet and chest. In accordance with the present system, however, several new and inventive features and approaches are provided to both speed up and simplify system installation from what other systems had achieved in the past, as follows.

First, the present shingles 10 are preferably dimensioned to be integer divisions or integer multiples of the solar module frames 20. For example, metal roofing shingles 10 can be sized to be ½ the width and ½ the height of the solar module frames 20. As such, the present system will be assembled with the solar modules positioned at precisely repeating locations on the roof. This is best understood by also referring to FIG. 2 which shows distances D1 and D2. Specifically, Distance D1 is the width of a solar module frame 20. Distance D1 is also the distance across two metal shingles 10 (Note: the dotted lines on the shingles show the lateral side-to-side overlap across a row of shingles 10, as will be further explained).

As can be seen, once the metal shingles 10 have been installed on the roof, the shingle positions themselves can be used to position the solar module frames 20 thereon. Simply put, there is a direct dimensional relationship between the size of the shingles 10 and the size of the solar module frames 20. As such, the shingles 10 serve as a template for positioning the mounting assemblies of the solar module frames 20 onto the roof.

Returning to FIG. 1A, the present mounting assemblies (40 in FIGS. 9A, 9B, 9D, 10A and 10B) can be located at positions 50. Exemplary positions 50 are shown here as being at locations 25% and 75% of the distance along the sides of the module frames. This represents an ideal placement as it minimizes cantilever effects across the width of the solar module frame. By using two mounting assemblies on the top and bottom sides of the solar module frames 20 as shown (one at 25% of the length of the solar module frame and the other at 75% of the length of the solar module frame), an appropriate balance between providing support to the center and free edges of the solar module frame is achieved. Importantly as well, in this particular layout, only two mounting assemblies 40 are required for supporting the top and bottom edges of each solar module frame 20. Additionally, all of the mounting elements are spaced at even intervals across the roof equal to 50% of the length of a module.

As will be further explained, mounting assemblies 40 also provide grounding between the upper and lower solar module frames 20 that each mounting assembly 40 supports. In addition, lateral bonding clips (60 in FIGS. 11A to 11D) can be positioned at locations 55. As will be explained, lateral bonding clips 60 provide both stability between solar module frames 20 that are mounted side-to-side across the roof, and also provide grounding between these adjacent solar module frames 20. As can be seen, mounting assemblies 40 provide grounding between solar module frames 20 in the up-and-down direction on the roof. At the same time, lateral bonding clips 60 provide grounding between solar module frames 20 in the lateral (side-to-side) direction. As such, all of the module frames 20 in the array can be grounded to one another.

In optional embodiments, GFCI (Ground Fault Circuit Interrupters) can be added to the PV array. GFCIs operate to switch off the circuit, thus ensuring that any fault in the photovoltaic array can be shorted to the grounded shingle layer. Such an emergency shutdown system operates to protect emergency workers like firefighters.

Figure 3:
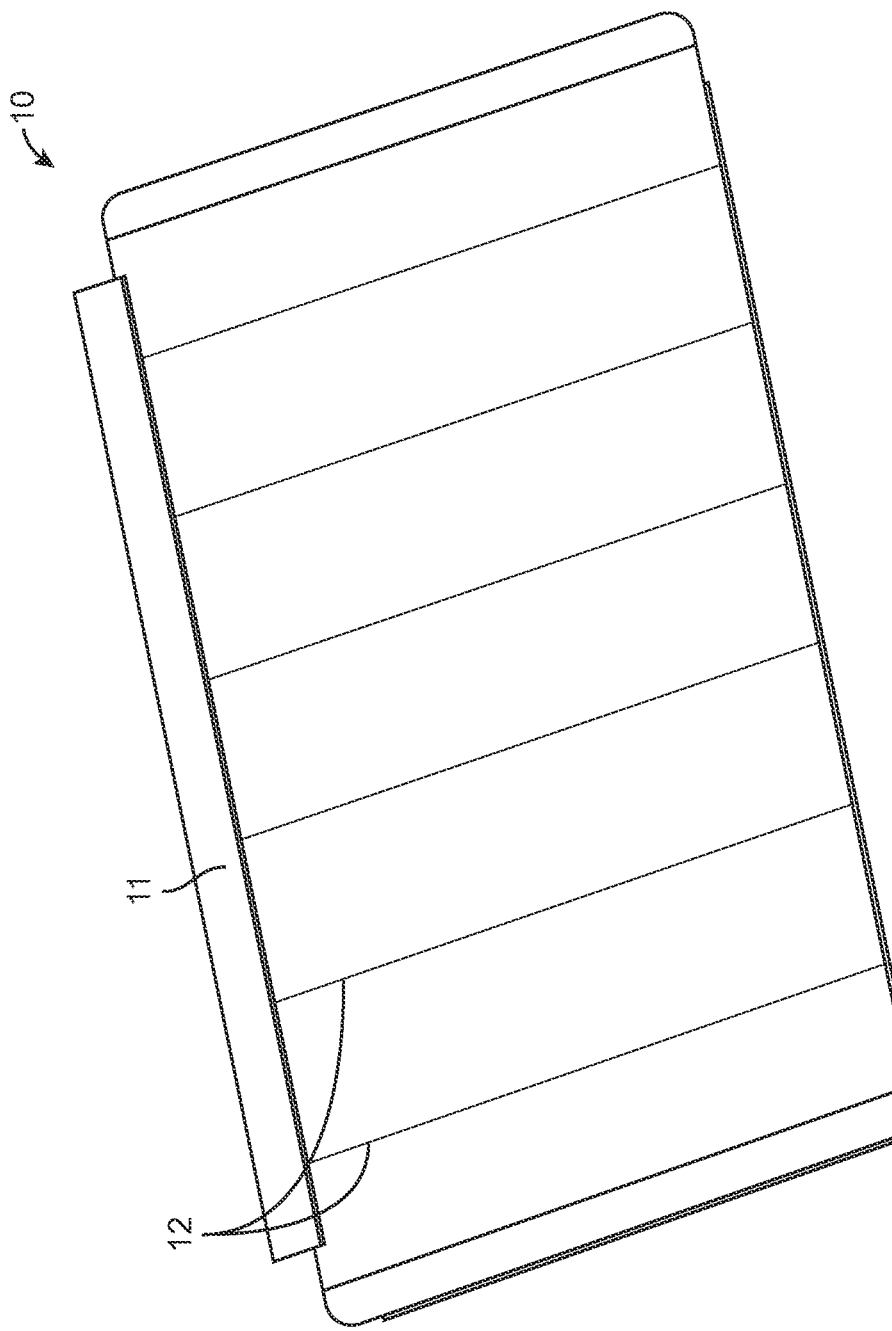
FIG. 3 is a top perspective view of an exemplary metal shingle having index lines thereon for use with the present system.

FIG. 3 illustrates an exemplary metal shingle 10. Shingle 10 has a nail strip 11 at its top end. Importantly, shingle 11 also has index marks 12 thereon. In this particular illustration, index marks 12 extend from the top to the bottom of the shingle. It is to be understood that other indexing mark configurations and designs may instead be used, all keeping within the scope of the present invention. Index marks 12 may be painted or inked onto shingles 10. Index marks 12 may also comprise grooves formed or cut into the shingle (in which case, such grooves could also provide capillary breaks and thus fight water intrusion as will be shown below). Additional index marks may also be provided, as desired. Nail strip 11 may also have index marks printed thereon. The optional index marks on nail strip 11 may be used to position mounting assemblies 40 and the index marks running up and down the face of the shingle (as illustrated) may be used to position laterally adjacent shingles, as follows.

Figure 4:
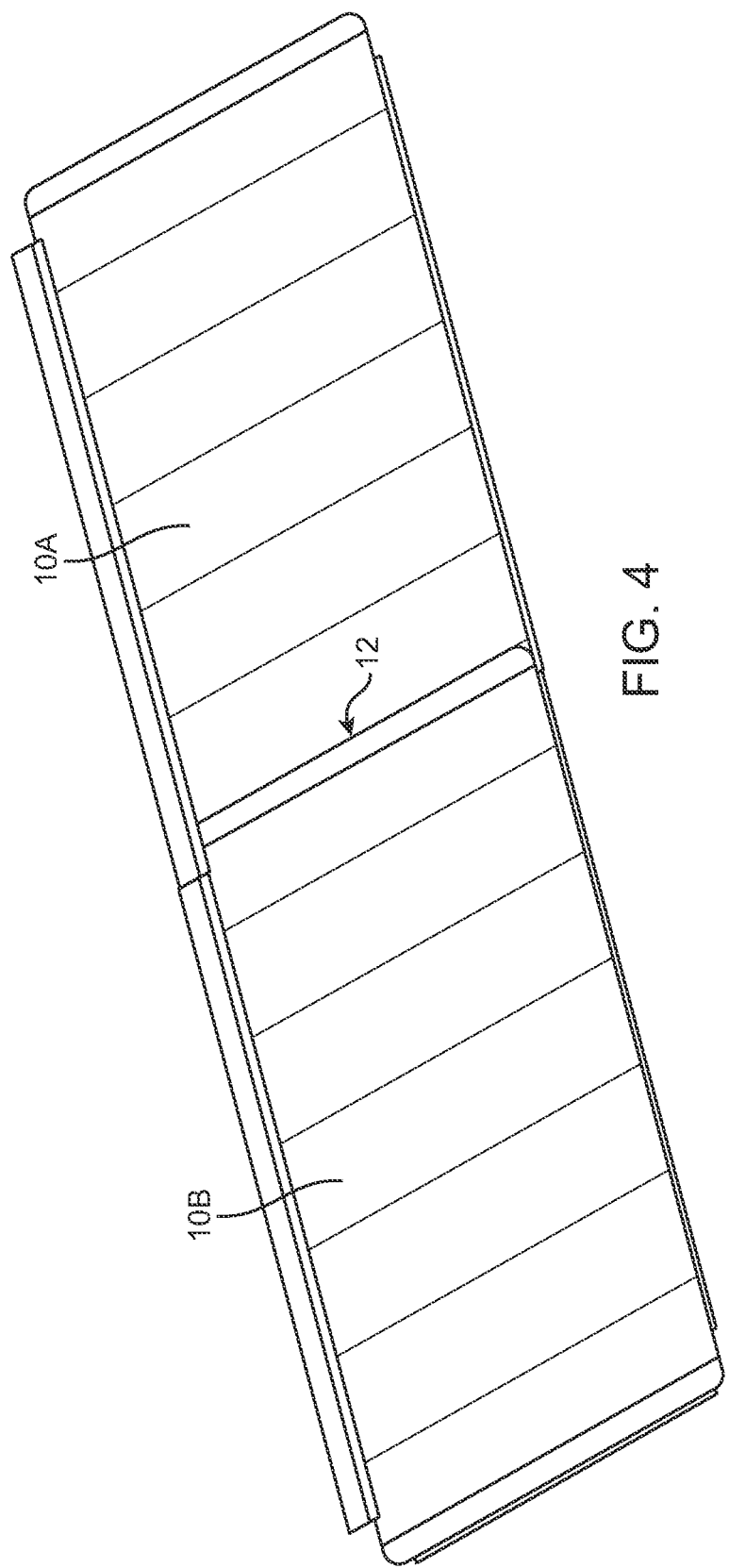
FIG. 4 is a top perspective view showing the alignment of two adjacent metal shingles using the index lines on the first metal shingle.
Figure 5:
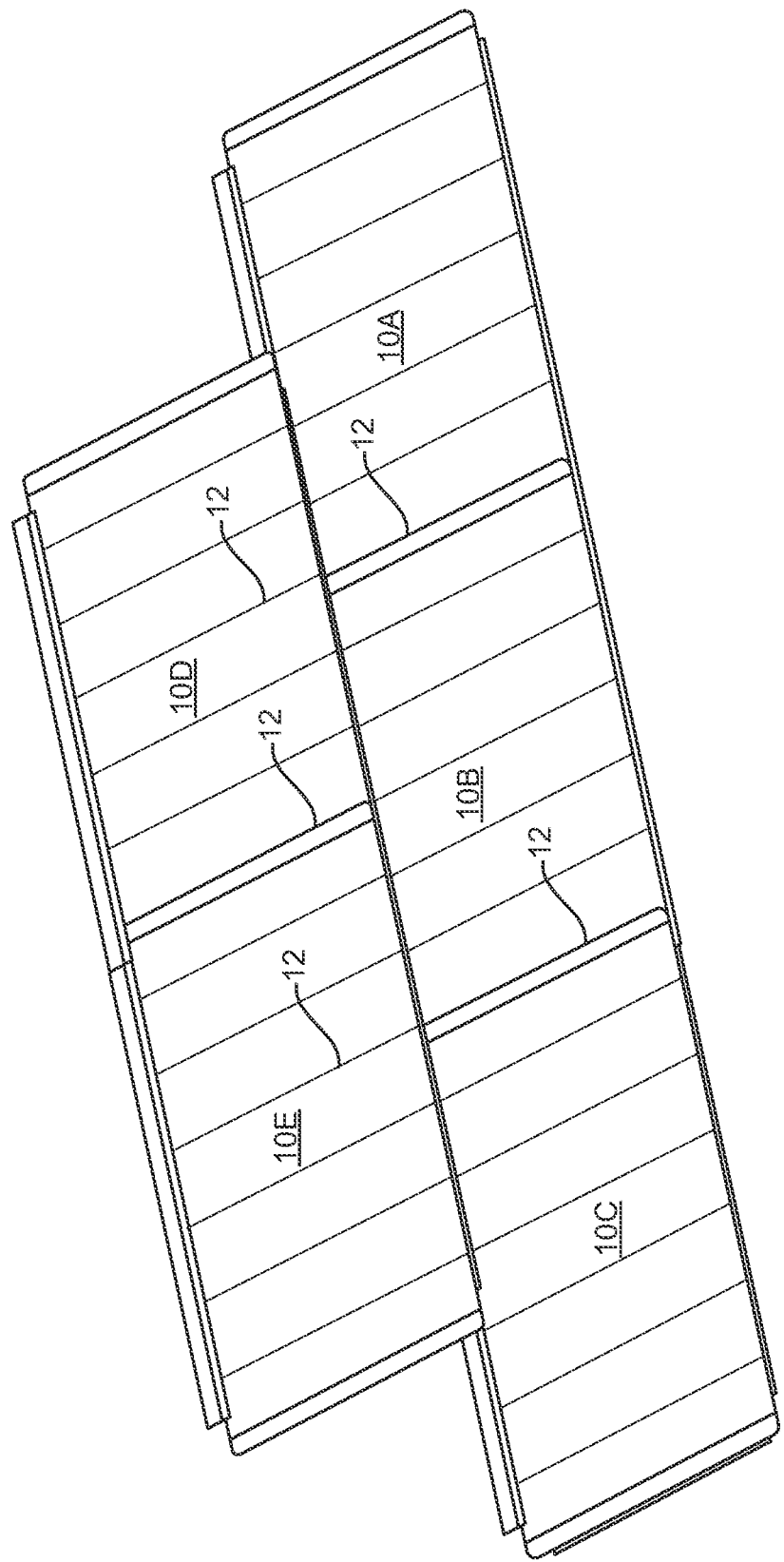
FIG. 5 is a top perspective view showing alignment of parallel rows of metal shingles using the index lines on the shingles.

Referring to FIG. 4, a first shingle 10A is nailed into position. Next, a second shingle 10B is laid down next to 10A. As can be seen, the right side edge of shingle 10B can be aligned with the leftmost index mark 12 on shingle 10A. This approach provides a rapid way of positioning one shingle after another across a lateral row of shingles even though the edge of the adjacent shingle 10B overlaps that of shingle 10A. Turning next to FIG. 5, the indexing marks 12 on the shingles 10 can be used both to position laterally adjacent shingles in a row of shingles and also to position a second row of shingles. Specifically, shingle 10A is first affixed to the roof. Next, shingle 10B is placed next to 10A with the right side edge of shingle 10B aligned with the leftmost index mark 12 on shingle 10A. Shingle 10C follows shingle 10B. Next, a new row is started with shingle 10D. As can be seen, shingle 10D can also be aligned with shingles 10A and 10B simply by aligning index marks 12 on the various shingles. Next, shingle 10E is placed adjacent to shingle 10D, etc.

Importantly, it is to be understood that the use of indexing marks 12 can be used to provide an aligned array of shingles covering a roof surface. As can also be seen, such alignment can easily be accomplished both in a lateral (i.e.: side-to-side across the roof) direction and in the perpendicular (up-and-down the roof) direction. Using the present index marked shingles, shingle installation is fast and easy.

A second benefit of the present index marked shingles is that they can be used to guide the placement of the mounting assemblies 40. Specifically, once the shingles have been placed on the roof in their aligned orientations, the mounting assemblies 40 can be positioned thereon. This is due to the fact that the present shingles 10 are preferably sized to correspond to the sizes of the solar module frames as explained above. For example, when the widths of the shingles are half of the width of the solar module frames, then every second shingle in a row will have a mounting assembly 40 positioned thereon at the same location on the shingle. As such, the position of shingles 10 conveniently set forth the positions of mounting assemblies 40 thereon. As a result, the various index marks on shingles 10 can be used to ensure spacing gaps between module frames 20 is consistent.

Figure 6:
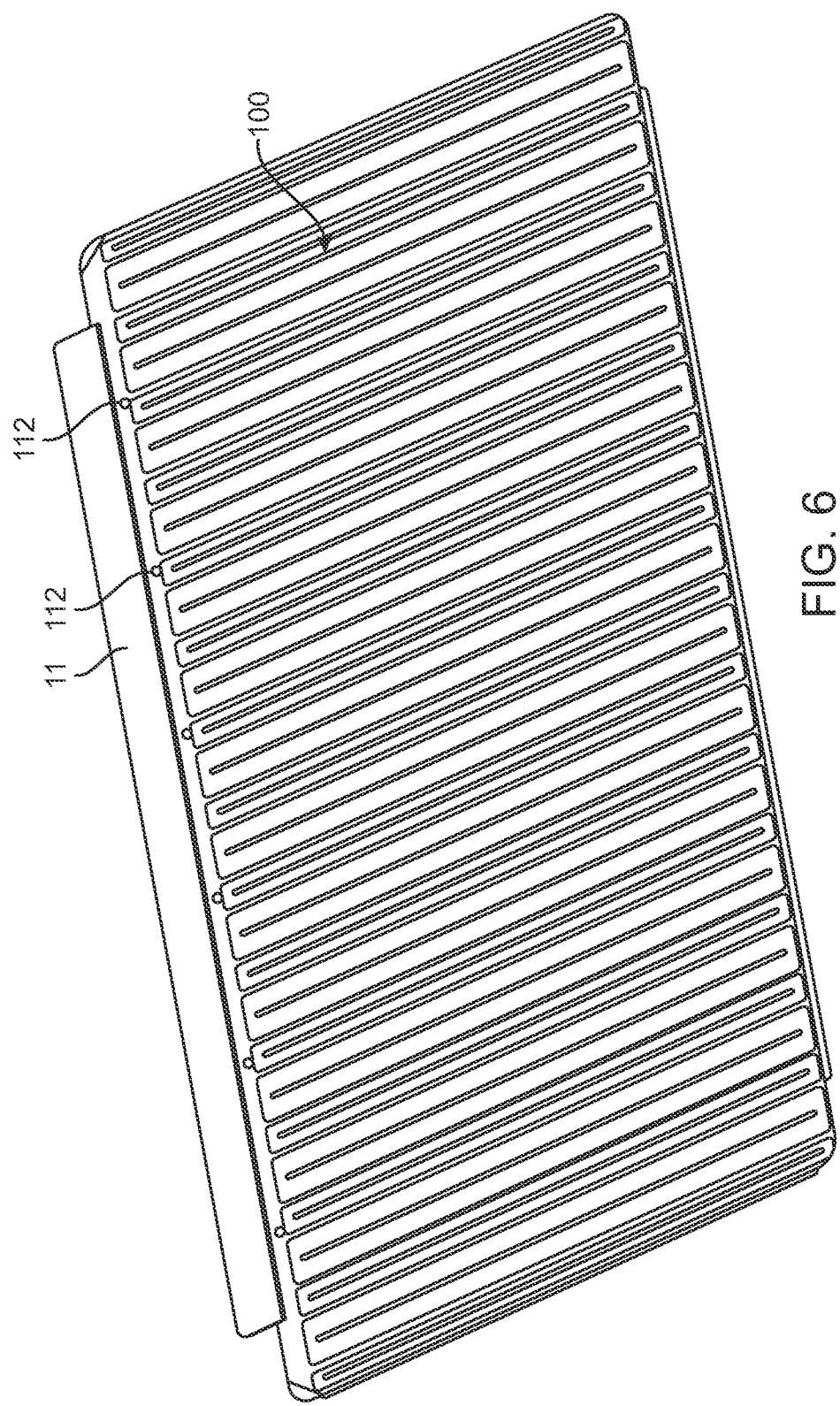
FIG. 6 is a top perspective view of an alternate corrugated metal shingle for use in accordance with the present system.

FIG. 6 shows an alternate exemplary shingle 10 for use in accordance with the present system. Shingle 100 is similar in dimensions to shingle 10. Shingle 100, however, has a surface which is corrugated (i.e.: it has a series of raised and lowered portions thereon). In further optional embodiments, the corrugated shingles may even be disposed in a large roll that is unwound onto the roof. Stamped dimples 112 can be used similar to the index marks 12 of shingle 10 when aligning the shingles in a lateral row. For example, the rightmost end of another shingle can be placed over the left edge of the shingle of FIG. 6, with its rightmost end aligned with the leftmost dimple 112 on the (bottom) shingle.

Figure 7:
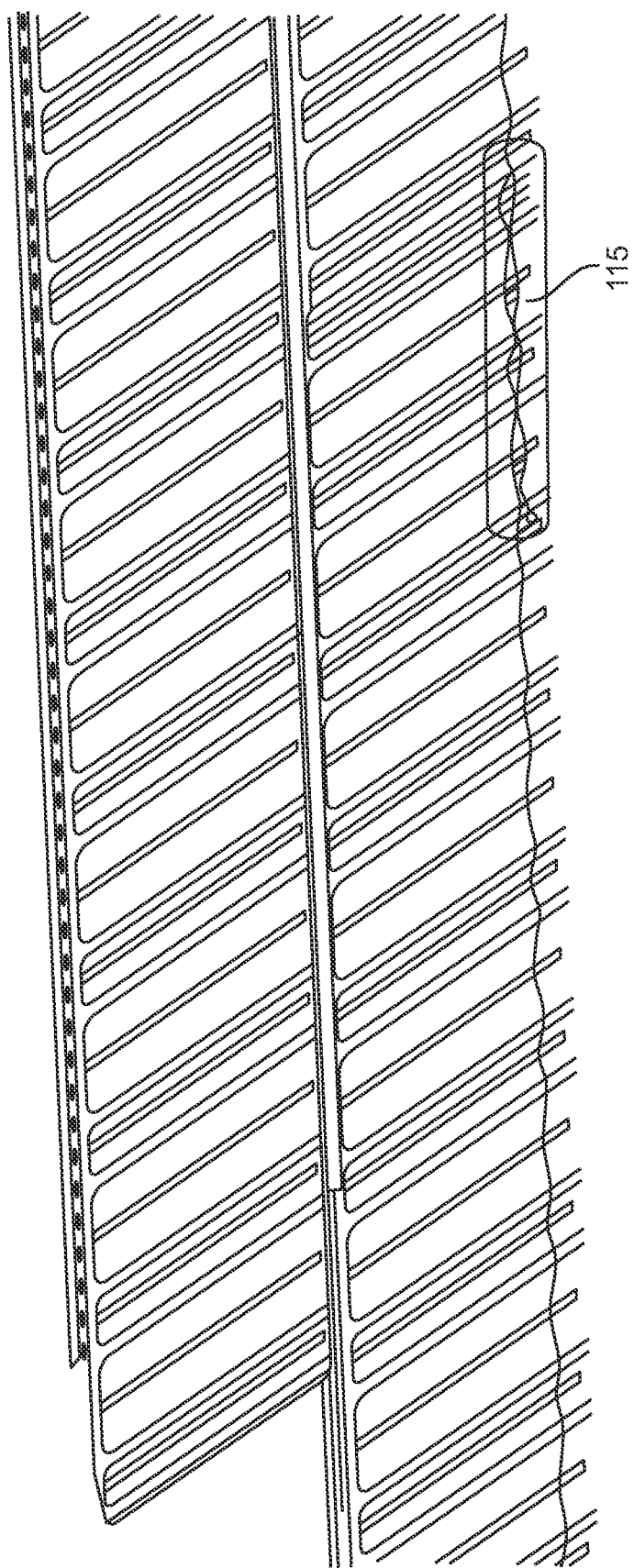
FIG. 7 is a top perspective view of a pair of the corrugated metal shingles of FIG. 6, showing overlapping edges of the corrugated shingles.

As best seen in FIG. 7, having the ends of shingles 100 overlay one another as shown in region 115 provides a series of capillary breaks between the shingles, thereby counteracting the effects of moisture intrusion. In various optional embodiments, long corrugated shingle sections can be provided such that they can be rolled out onto the roof.

Figure 8A:
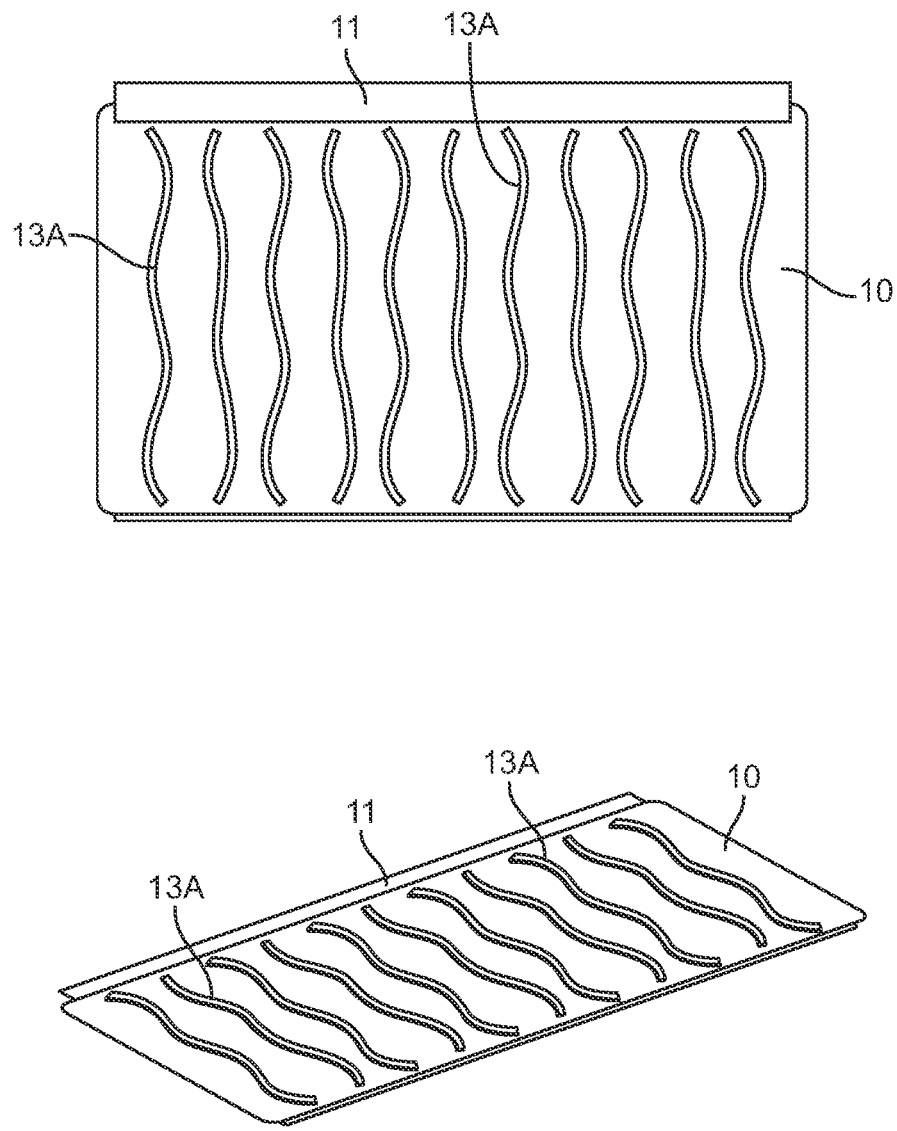
FIG. 8A is a top and perspective view of an alternate metal shingle having stamped wavy lines formed therein for providing capillary breaks for use with the present system.

FIG. 8A is a top and perspective view of an alternate metal shingle 10 having stamped wavy lines 13A formed therein for providing capillary breaks for use with the present system. Specifically, a capillary break is formed when similar shingles are stacked one over top of another. Similarly, FIG. 8B is a top and perspective view of an alternate metal shingle 10 having stamped straight lines 13B formed therein for providing capillary breaks for use with the present system.

Figure 8C:
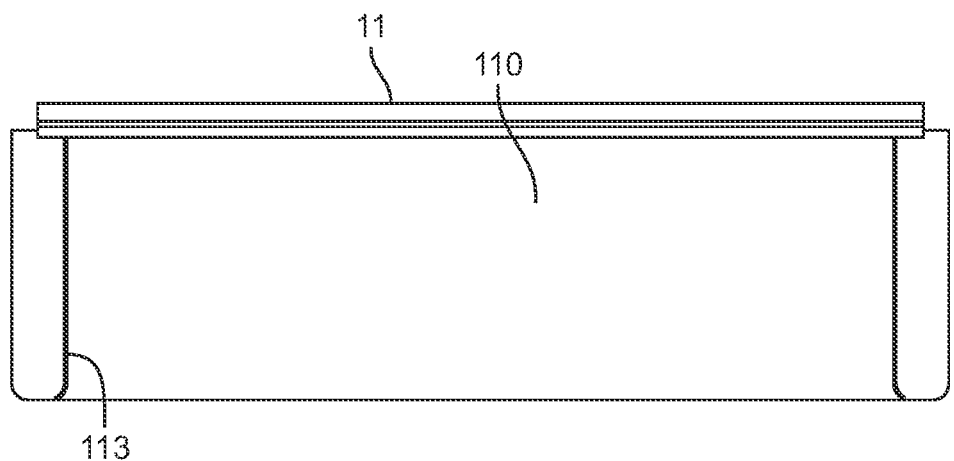
FIG. 8C is a top plan view of an alternate metal shingle having overlapping raised portions near its edges to provide a block for wind driven rain, to protect the edge from being caught by ropes, shoes, or other installer activity, and it is a capillary break.
Figure 8D:
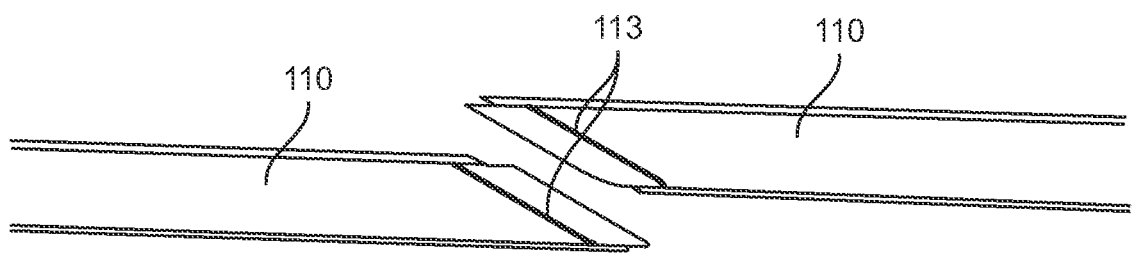
FIG. 8D is a perspective view of a pair of the shingles of FIG. 8C showing the overlap of one shingle onto another during assembly.

FIG. 8C is a top plan view of an alternate metal shingle 110 having overlapping raised portions 113 near its edges to provide an aesthetic and mechanical edge cover. Specifically, as seen in FIG. 8D, a pair of shingles 110 are placed one over top of the other at their respective edges, providing protection to the cantilevered free edge of the uppermost shingle. The raised portions 113 in FIGS. 8C and 8D are for managing the overlapped edges to avoid an aesthetic issue of one edge popping up, and to avoid the top most edge from getting snagged by ropes, shoes or other installer activity.

Figure 9A:
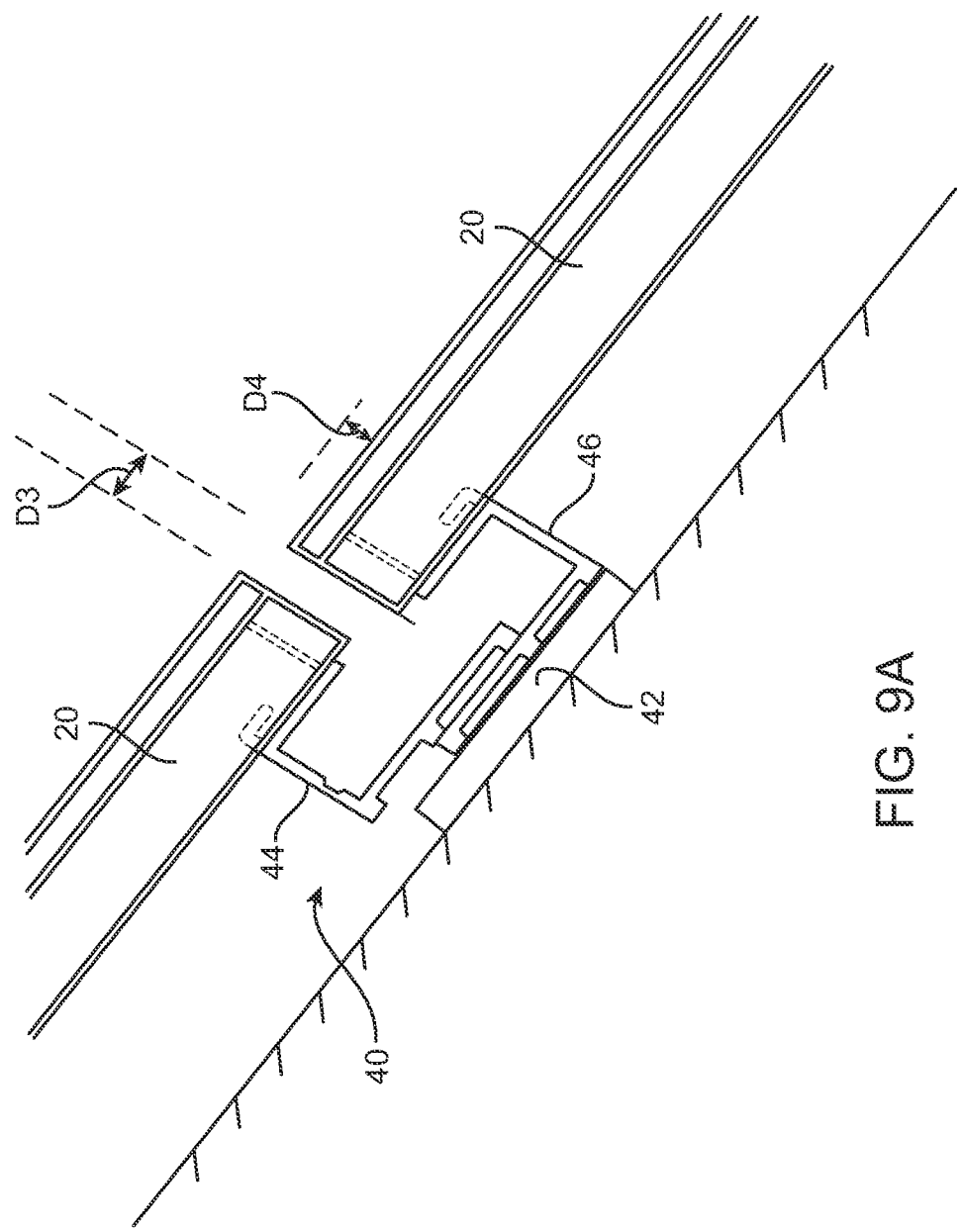
FIG. 9A is a side elevation view of the mounting assembly supporting an upper solar module frame and a lower solar module frame thereon.
Figure 9C:
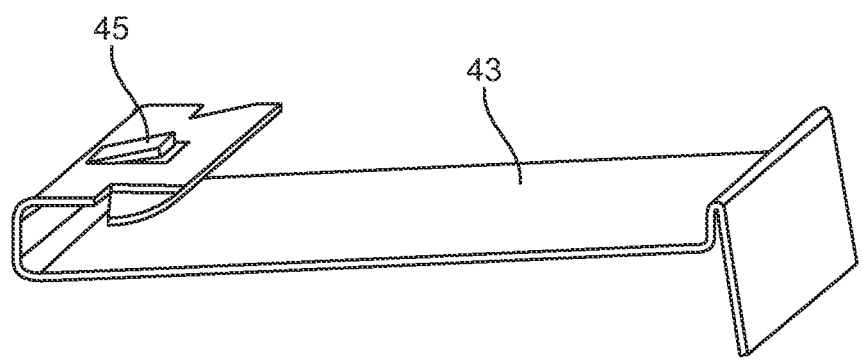
FIG. 9C is a perspective view of the retaining and grounding clip of FIGS. 9A and 9B.
Figure 9F:
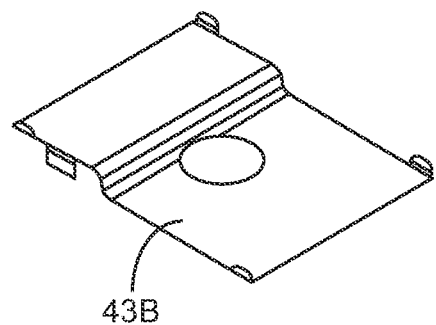
FIG. 9F is a top perspective view of the grounding clip of FIG. 9D.
Figure 9D:
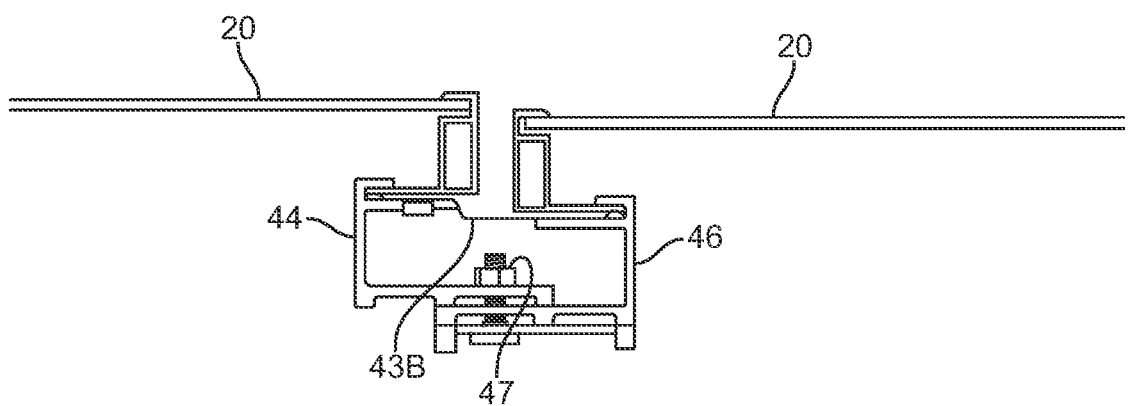
FIG. 9D is a view similar to FIG. 9A, but instead using a single retaining and grounding clip to connect to both the upper and lower solar module frames.
Figure 9E:
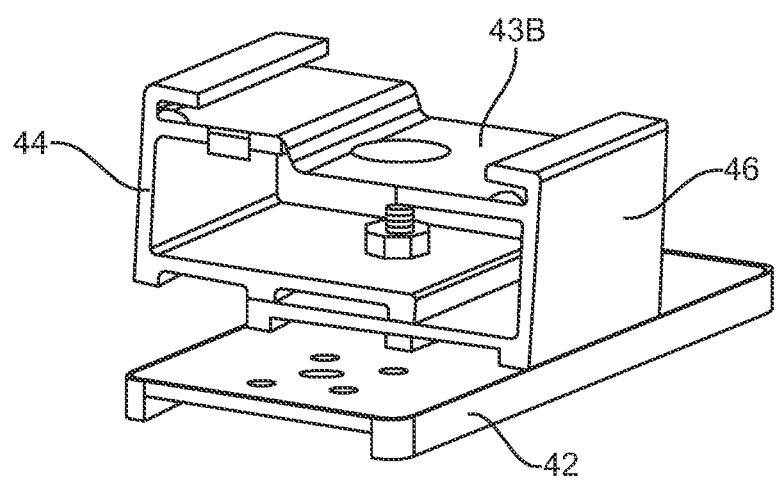
FIG. 9E is a perspective view of the mounting assembly of FIG. 9D.
Figure 9H:
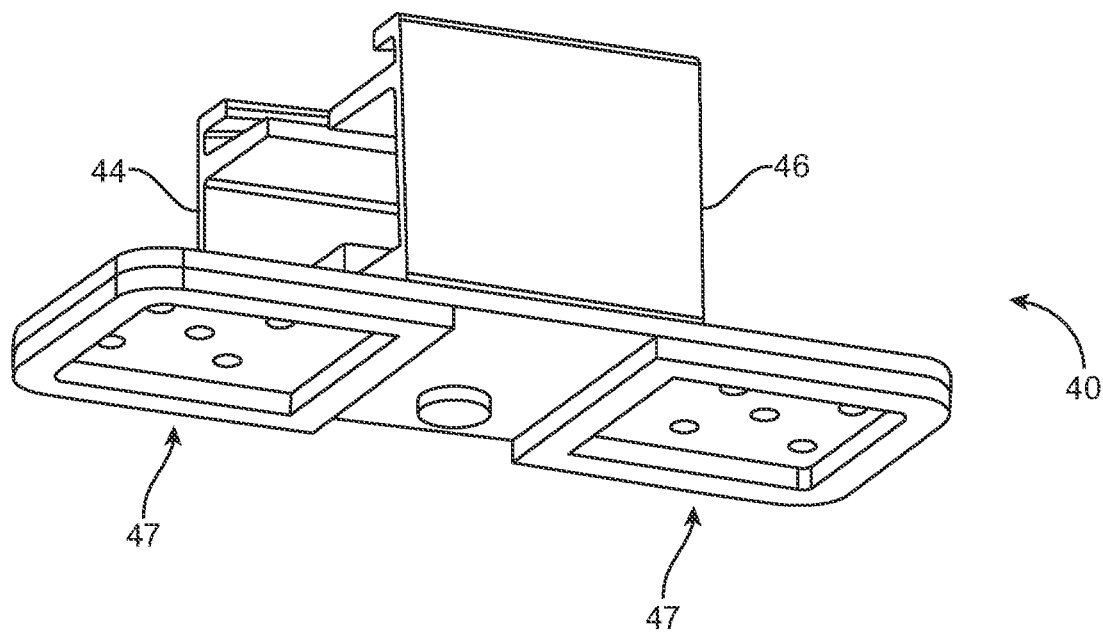
FIG. 9H is a bottom perspective view corresponding to FIG. 9G.
Figure 9I:
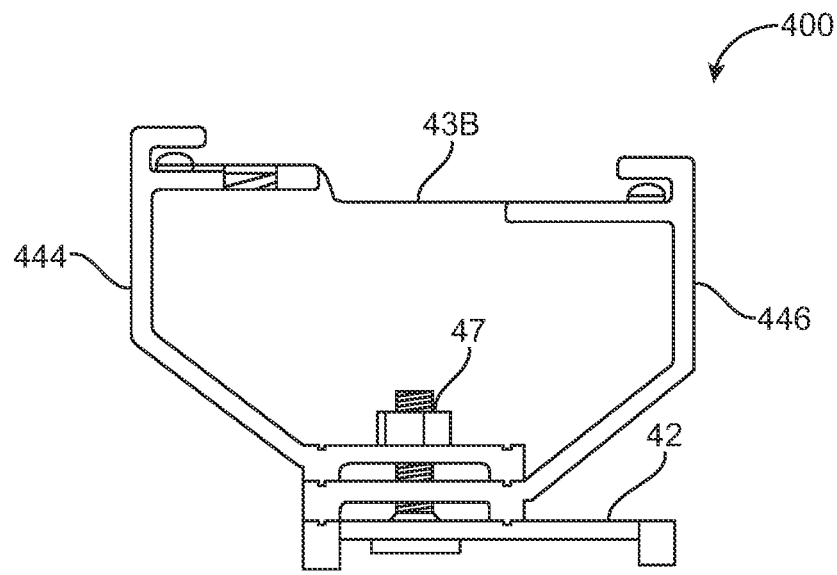
FIG. 9I is a side elevation view of an alternate mounting assembly.
Figure 9J:
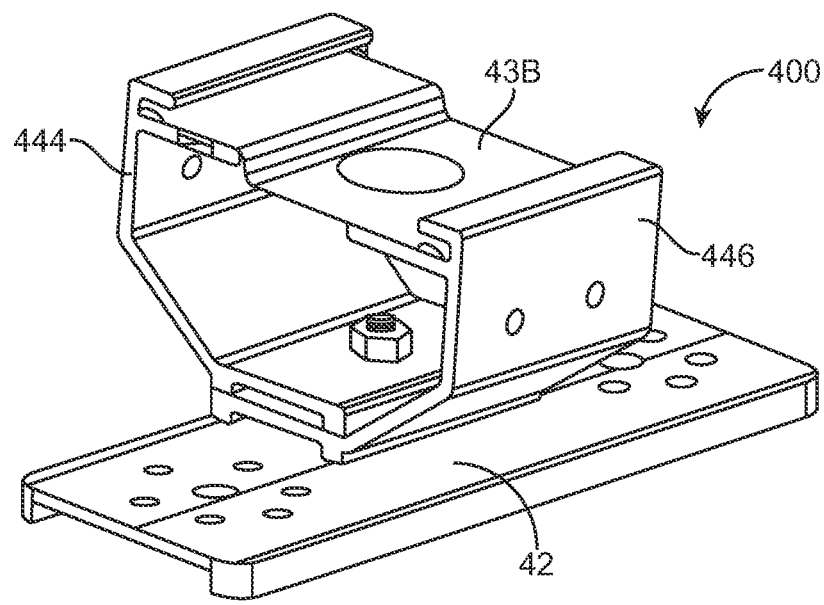
FIG. 9J is a front perspective view of the mounting assembly of FIG. 9I.
Figure 9K:
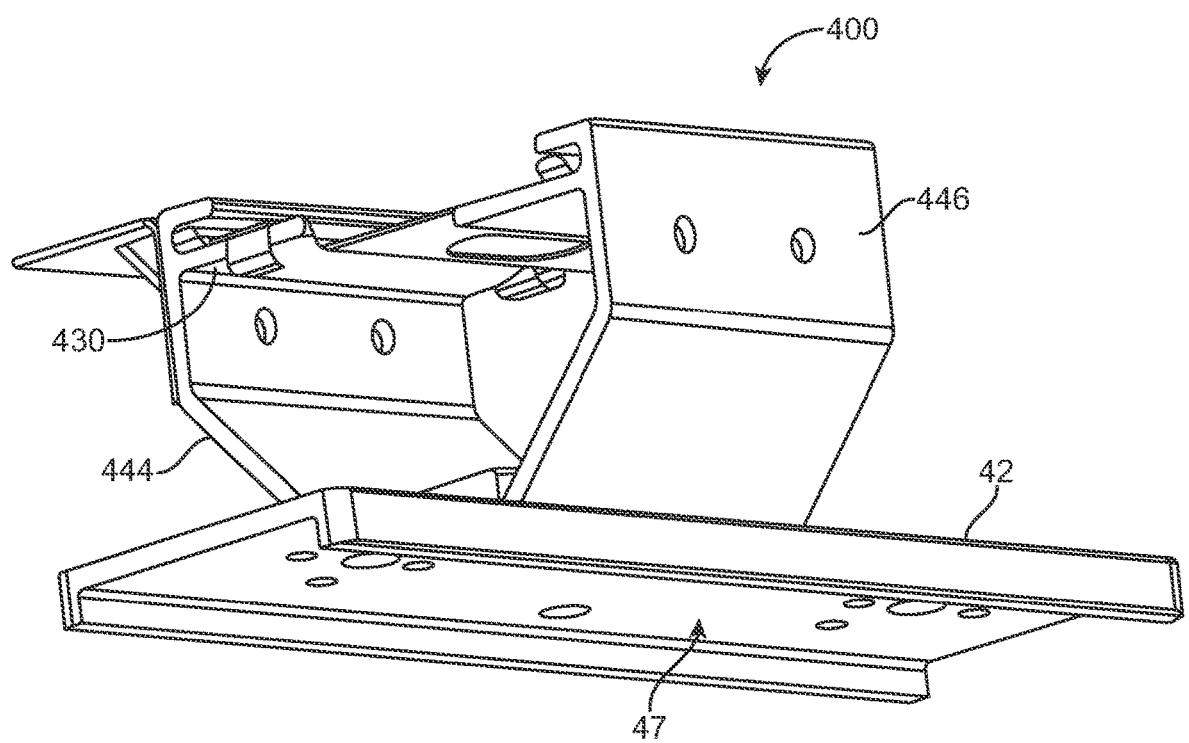
FIG. 9K is a bottom perspective view of the mounting assembly of FIG. 9I, showing an optional grounding element.
Figure 9L:
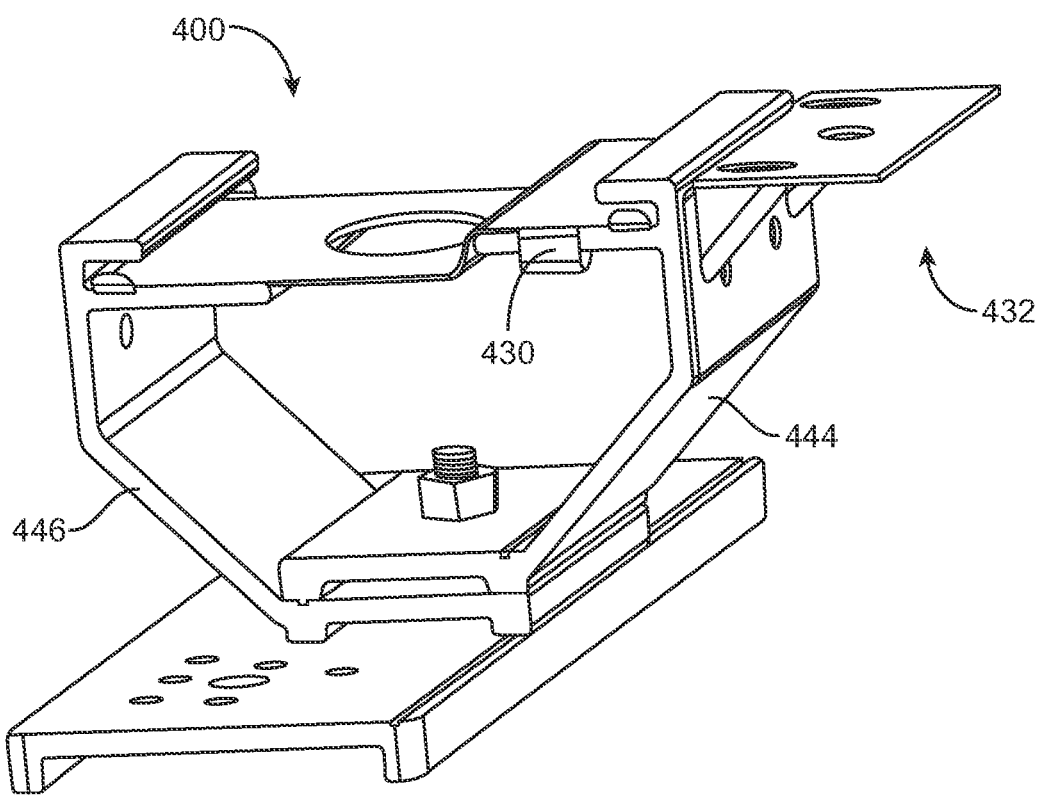
FIG. 9L is a side perspective view of the mounting assembly of FIG. 9I, showing an optional power electronics or micro-inverter mounting bracket.
Figure 9M:
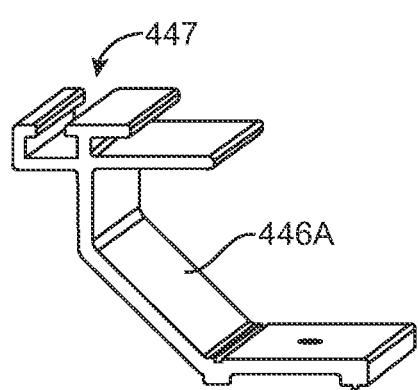
FIGS. 9M to 9O are perspective views of an embodiment of the mounting assembly having a T-slot to attach an inverter thereto.
Figure 9N:
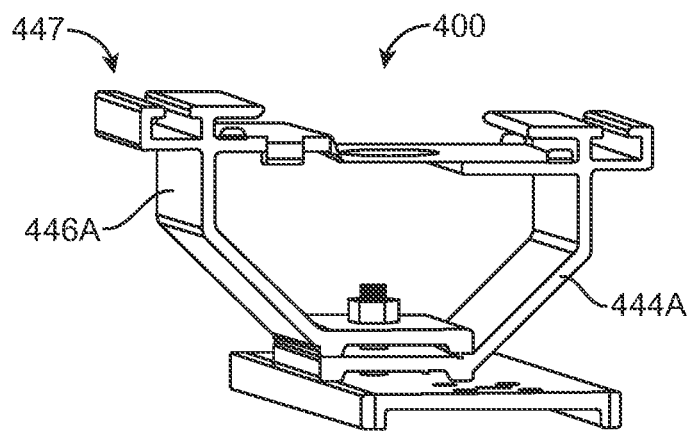
Figure 9O:
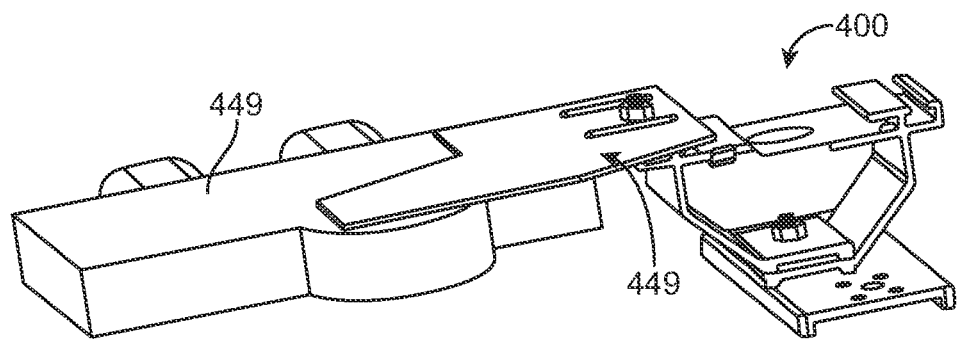
Figure 9P:
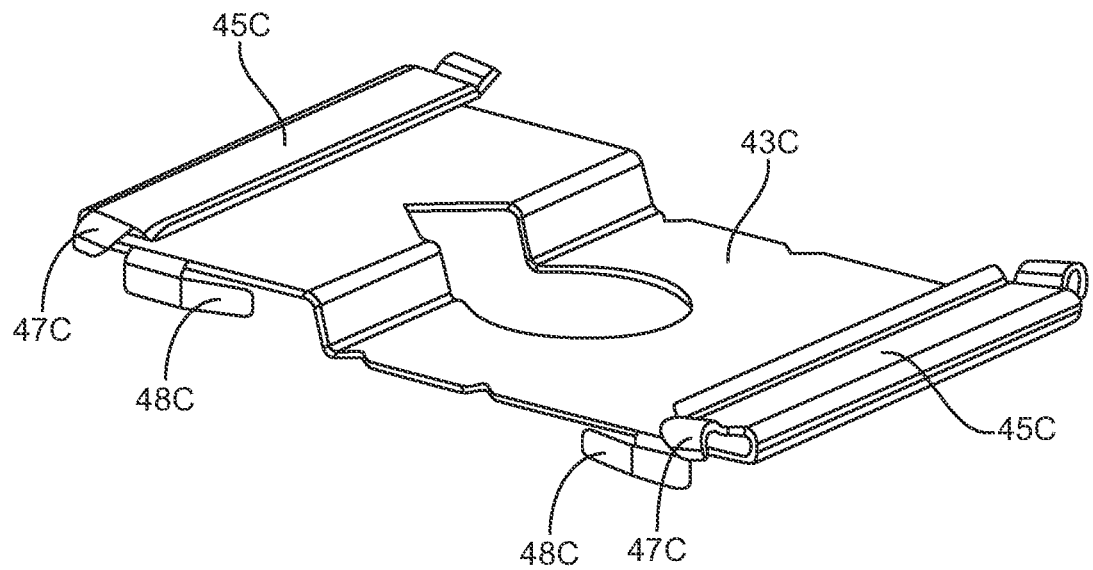
FIG. 9P is a perspective view of an alternate grounding clip.
Figure 9Q:
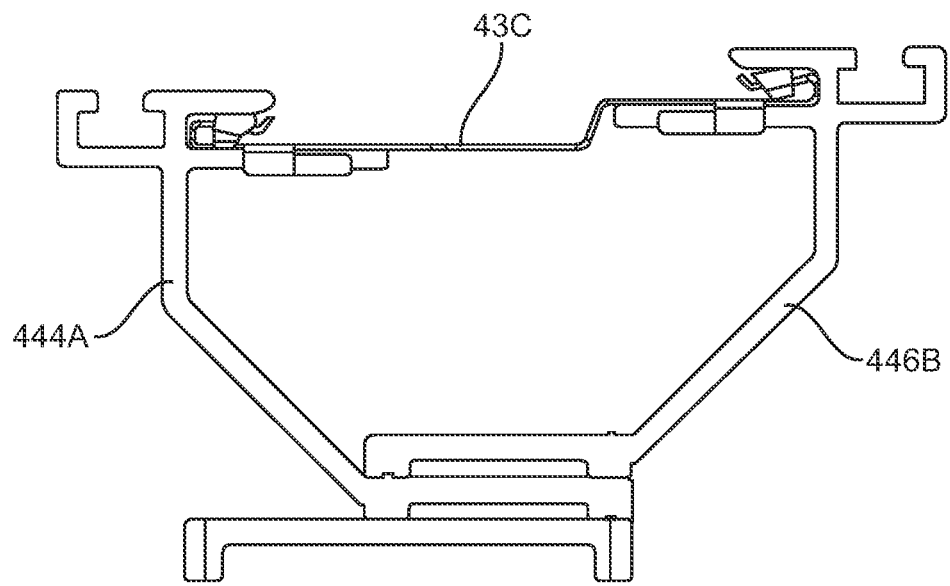
FIG. 9Q is a side elevation view of the grounding clip of FIG. 9P installed in a mounting assembly.
Figure 9R:
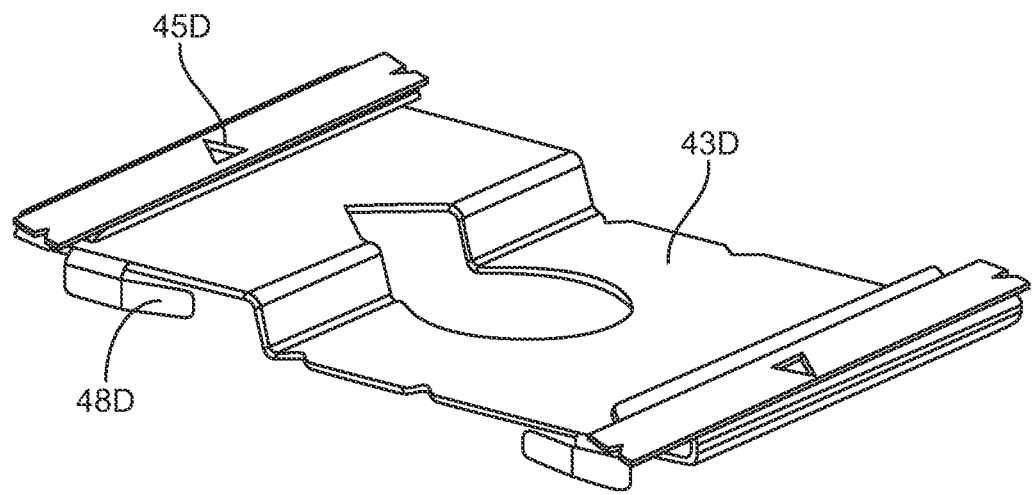
FIG. 9R is a perspective view of an alternate grounding clip.
Figure 9S:
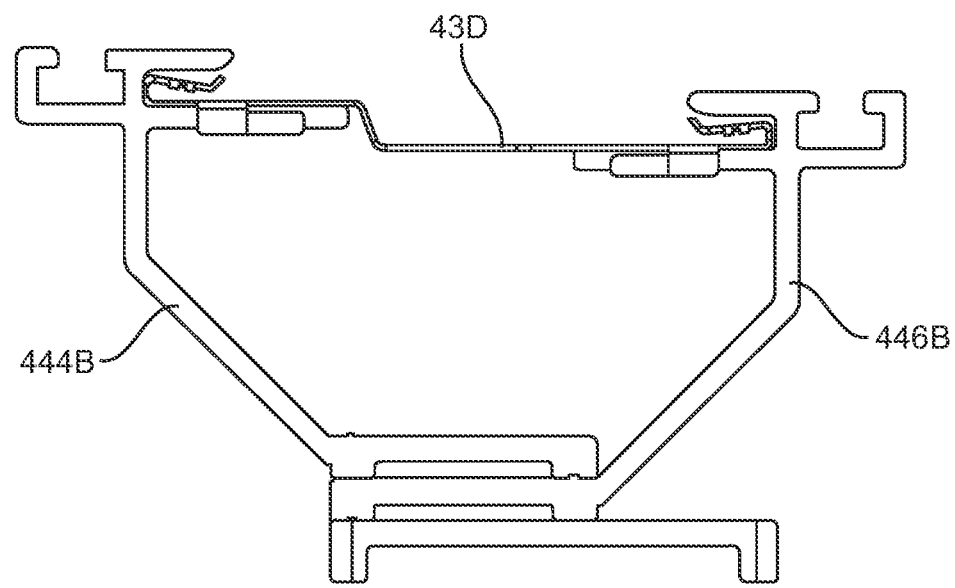
FIG. 9S is a side elevation view of the grounding clip of FIG. 9R installed in a mounting assembly.

FIGS. 9A through 9S show further details of the preferred mounting assemblies 40 which support solar module frames 20 thereon. Taken all together, the present system provides a solar power system for a metal shingled roof, comprising: a plurality of metal roofing shingles 10; and a plurality of solar module mounting assemblies 40. Solar Module mounting assemblies 40 are preferably configured to be deck-mounted through the metal roofing shingles into a roof, although other options are also contemplated (for example, simply attaching to the metal shingles 10), all keeping within the scope of the present system.

As seen in FIGS. 9A to 9E, solar Module mounting assemblies 40 preferably each comprise a base 42, an upper module cleat 44 mounted onto base 42, the upper module cleat 44 being configured to support a lower end of an upper solar module frame 20, and a lower module cleat 46 mounted onto base 42, the lower module cleat 46 being configured to support an upper end of a lower solar module frame 20.

The upper and lower module cleats 44 and 46 are preferably configured to support the upper and lower solar module frames such that the upper and lower module frames are both: (a) spaced apart a distance D3 (running generally parallel to the surface of the roof), and (b) spaced apart a distance D4 (running generally perpendicular to the roof). Each of these two spacings or gaps provide unique advantages to the present roofing system, as follows.

First, the distance gap or spacing in direction D3 provides each of upper and lower cleats 44 and 46 with space to flex as solar module frames 20 thermally expand or contract. Specifically, when module frames 20 become heated and expand, cleats 44 and 46 can flex slightly towards one another to accommodate this expansion. Conversely, when module frames 20 cool off and contract, cleats 44 and 46 can flex away from one another to accommodate this contraction. The benefit of the present gap or spacing in distance D3 is that the thermal expansion and contraction of any one module does not affect the surrounding module frames. Importantly, since the sides of the modules frames 20 are always held slightly apart from one another (by distance D3), they never touch. This is a fundamentally different approach from many existing solar systems in which the expansion and contraction of one module frame simply causes it to push against or pull away from an adjoining module frame. Another benefit of the gap in distance D3 is that it permits access from above for a single tool (to affix screw or bolt 47) to be inserted and tightened (to simultaneously hold cleats 44 and 46 into position).

Second, the preferred spacing in direction D4 ensures that the two solar module frames 20 held by mounting assembly 40 are slightly offset from one another and do not share the exact same plane. The advantage of this mounting technique provides the illusion that the solar modules are somewhat overlapping to look like shingles themselves. The aesthetic benefit of this is somewhat counterintuitive. Specifically, it has been difficult to provide a completely planar solar array on many buildings due to the fact that the roof itself is seldom completely planar. Instead, roofs tend to have irregularities where they stick up a bit too much in one place and other irregularities where they tend to sag down a bit too much in another area. Attempting to place a planar array of solar modules onto a roof that is not truly planar itself has been very time consuming in the past. Moreover, small adjustments in module placement can have surprisingly large visual effects. This forces installers to spend an inordinate amount of time raising and lowering the sides and ends of the solar modules to achieve the right look. However, with the present system, all of this problem is completely avoided. Instead, it is the intention of the present system to have the solar modules 20 appear somewhat staggered in height (by distance D4). This makes alignment much faster and easier. These small differences in the heights of the modules in a direction perpendicular to the roof (i.e.: distance D4) ideally camouflages irregularities in the roof itself.

As seen in FIGS. 9A, 9B and 9C, the solar module frames 20 can be held securely in place by grounding clips 43. As seen in FIG. 9C, grounding clips 43 can have a small hook or barb 45 that scrapes into the anodized frame of modules 20, thereby establishing electrical contact with the module frame. As such, a grounding path is provided from the upper module frame 20 through its grounding clip 43, upper cleat 44, lower cleat 46, grounding clip 43 and into the lower module frame 20. FIGS. 9D to 9F show an alternate grounding clip 43B connecting both the upper and lower module frames. In this embodiment, grounding clip 43B preferably has a large hole therein providing tool access to bolt or screw 47 below. Grounding clip 43B provides direct grounding between the two module frames 20 (rather than relying on the grounding path going through cleats 44 and 46 as in the case of a pair of grounding clips 43). Another advantage common both to grounding clips 43 and 43B is that the direction of the barb 45 allows for frame movement up-and-down in the direction along the roof, but also constrains lateral motion of the frames 20.

FIG. 9G shows a sealant injected through holes 49 to seal mounting assembly 40 onto the roof. FIG. 9H shows a bottom cavity 47 on each "leg" of base 42. Bottom cavity 47 can be used to place the sealant therein (such as a butyl pad, silicone, asphalt, etc.) to assist in securing mounting assembly 40 onto the roof. Screw holes 48 may be positioned above cavity 47 on the two legs of mounting assembly 40. Screws passing through holes 48 (and cavity 47 below which is filled with sealant) can be used to deck mount the mounting assembly through the metal shingles 10 directly onto the roof. In alternate embodiments, the mounting assembly 40 may be secured only to the shingles, and not to the roof deck below. It is to be understood that the present system encompasses both of these possibilities in mounting.

FIGS. 9I to 9L show an alternate mounting assembly 400 having a first cleat 446 and a second cleat 444 operating similar to mounting cleats 46 and 44 described above. An optional grounding element 430 is provided both for grounding and for module retention. Lastly, in FIG. 9L an optional support bracket 432 is provided for supporting power electronics, microinverters, rapid shutdown devices or similar accessories.

FIGS. 9M to 9O are perspective views of an embodiment of the mounting assembly where cleats 446A and 44A each have a T-slot 447 to attach an inverter 449 thereto.

FIG. 9P is a perspective view of an alternate grounding clip 43C and FIG. 9Q is a side elevation view of the grounding clip 43C installed in a mounting assembly. Clip 43C has a flexible portion 45C, a bond cutter 47C and bonding springs 48C. Grounding clip 43C's flexible portion 45C permits flexing during installation such that the modules 20 do not smash into the mounting assembly. Flexible portions 48C assist in properly locating and positioning the side edges of modules 20.

FIG. 9R is a perspective view of an alternate grounding clip 43D having a barb 45D that scrapes into the anodized frame of modules 20, thereby establishing electrical contact with the module frame. Flexible portions 48D assist in properly locating and positioning the side edges of modules 20. FIG. 9S is a side elevation view of the grounding clip of FIG. 9R installed in a mounting assembly.

Figure 10C:
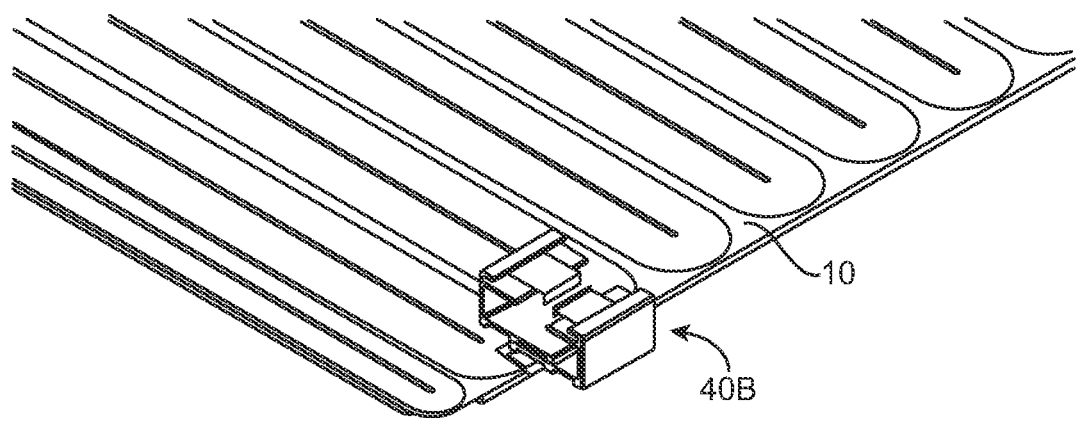
FIG. 10C is a side perspective view corresponding to FIG. 10A, showing the position of the mounting assembly with respect to the shingle.
Figure 10A:
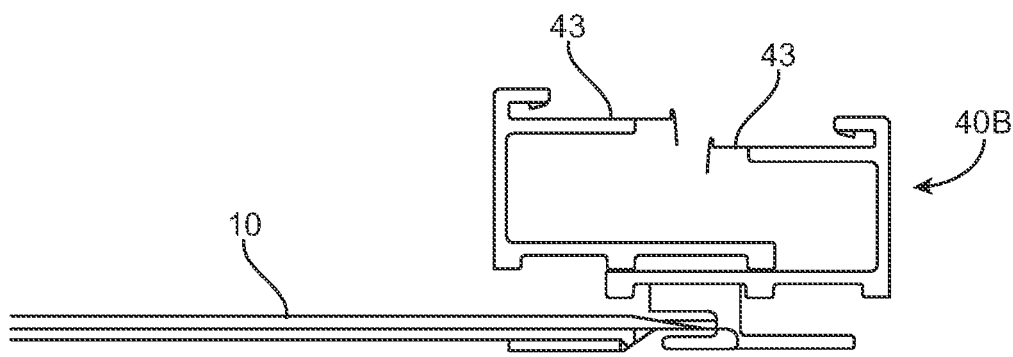
FIG. 10A is a side elevation view of an alternate mounting assembly that is mounted through a cut in a shingle to a bracket beneath the shingles.
Figure 10B:
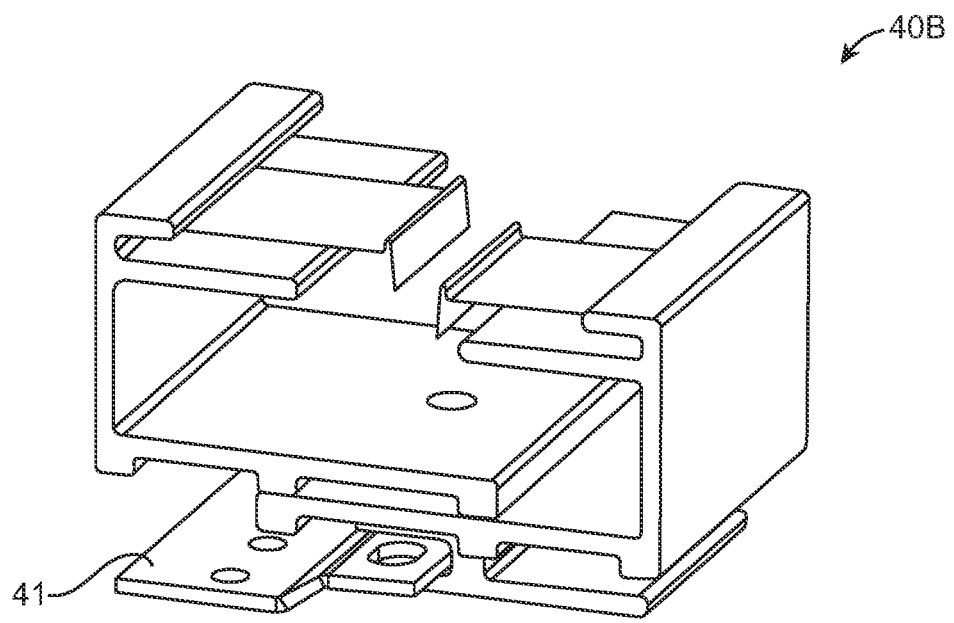
FIG. 10B is a front perspective view corresponding to FIG. 10A.

FIG. 10A is a side elevation view of an alternate mounting assembly 40B that is mounted through a cut in a shingle 10 to a bracket beneath the shingles. The side perspective view of FIG. 10C shows the position of the mounting assembly 40B with respect to the shingle. As seen in FIG. 10B, a bracket 41 is provided. Bracket 41 mounts to the roof deck and comes up through either a pre-cut or hand-cut hole in shingle 10, or fits within the overlapping shingles with no cuts at all. Portions of the upper and lower edges of successive shingles can be wrapped around bracket 41, thereby providing alternatives to screwing through the metal shingle. This enables a sturdy mounting point that is concealed within the shingles for mounting the solar array. In addition, bracket 41 provides grounding up and down the metal shingle array. Specifically, mounting assembly 40B holds the overlapping top and bottom edges of the metal roofing shingles 10. As such, mounting assembly 40B not only grounds the shingles to one another, but it also grounds the module frames 20 to one another. As such, the shingles and the module frames can all be grounded to one another.

Figure 10D:
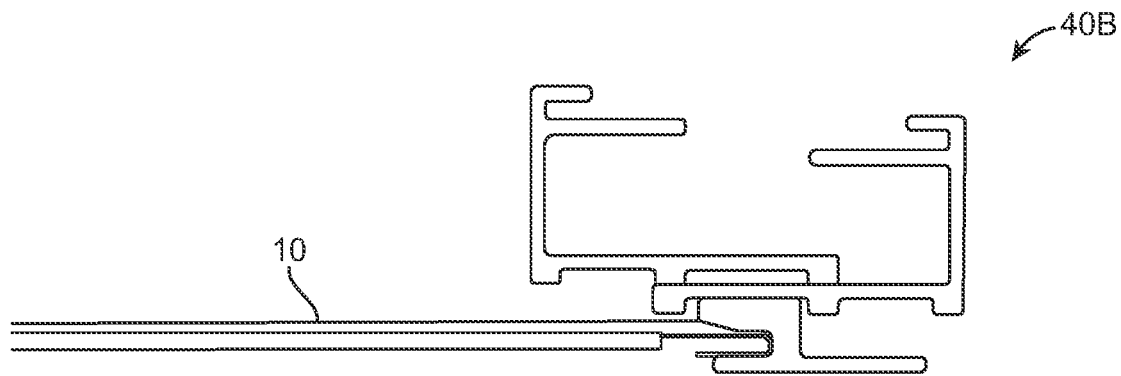
FIG. 10D is a side elevation view of a mounting assembly positioned on the edge of a shingle.
Figure 10E:
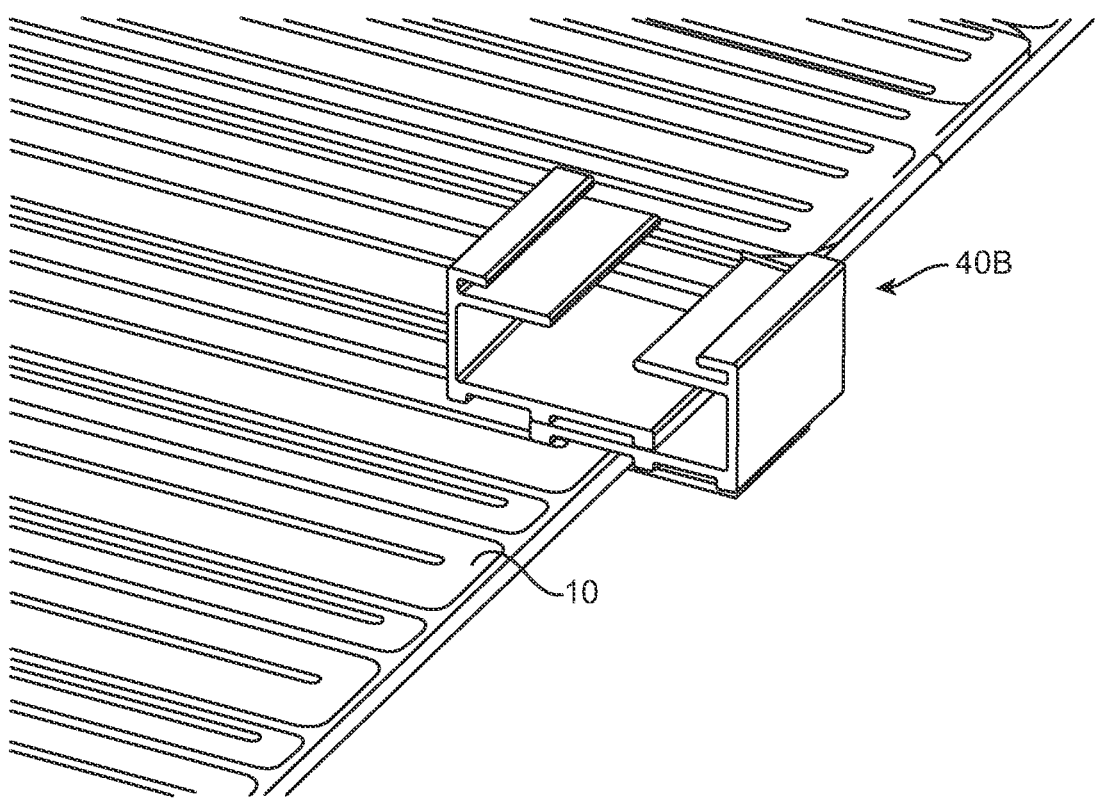
FIG. 10E is a side perspective view corresponding to FIG. 10D, showing the position of the mounting assembly with respect to the shingle.
Figure 10F:
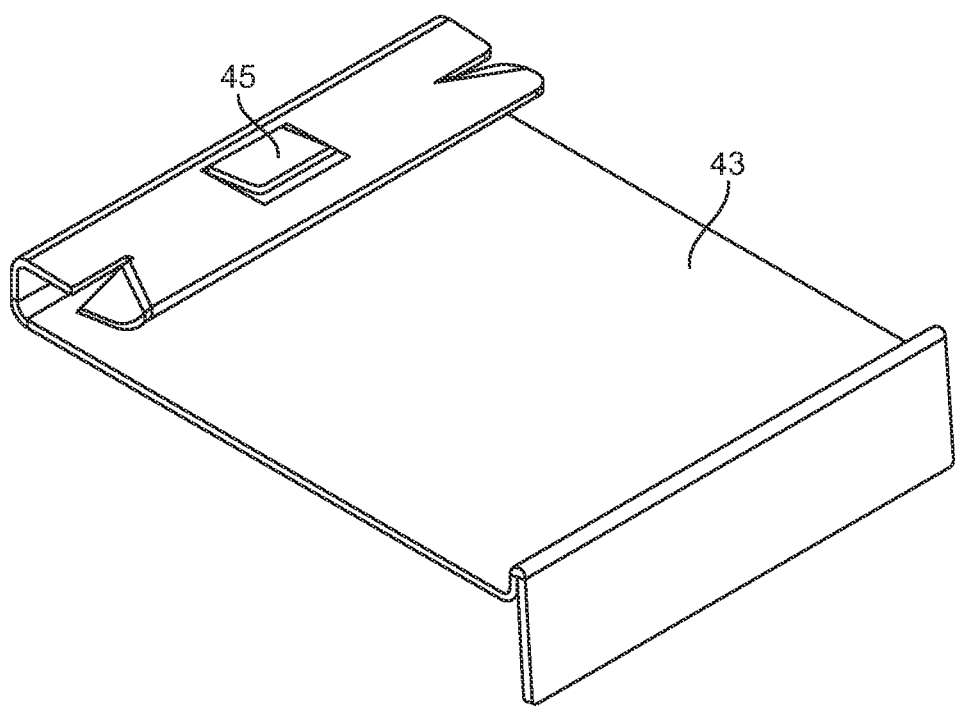
FIG. 10F is a perspective of the mounting clip of FIG. 10A.

FIGS. 10D and 10E show mounting assembly 40B positioned on the edge of a shingle. FIG. 10F is a perspective of the mounting clip 43 of FIG. 10A. The assembly shown in FIG. 10D has the advantage that it may clamp directly onto the shingles with no intermediate bracket 41 if desired.

FIGS. 11A to 11D show the placement of the lateral bonding clip 60 between two adjacent solar module frames 20. Each lateral bonding clip 60 is dimensioned to hold laterally adjacent solar module frames 20 in alignment with one another while maintaining electrical conductivity between the laterally adjacent solar module frames. Preferably, the lateral bonding clip 60 has a pair of grounding barbs 61 thereon. One grounding barb 61 will make electrical contact with one of module frames 20 in FIG. 11A, and the other grounding barb 61 will make electrical contact with the other of module frames 20 in FIG. 11A.

Figure 11A:
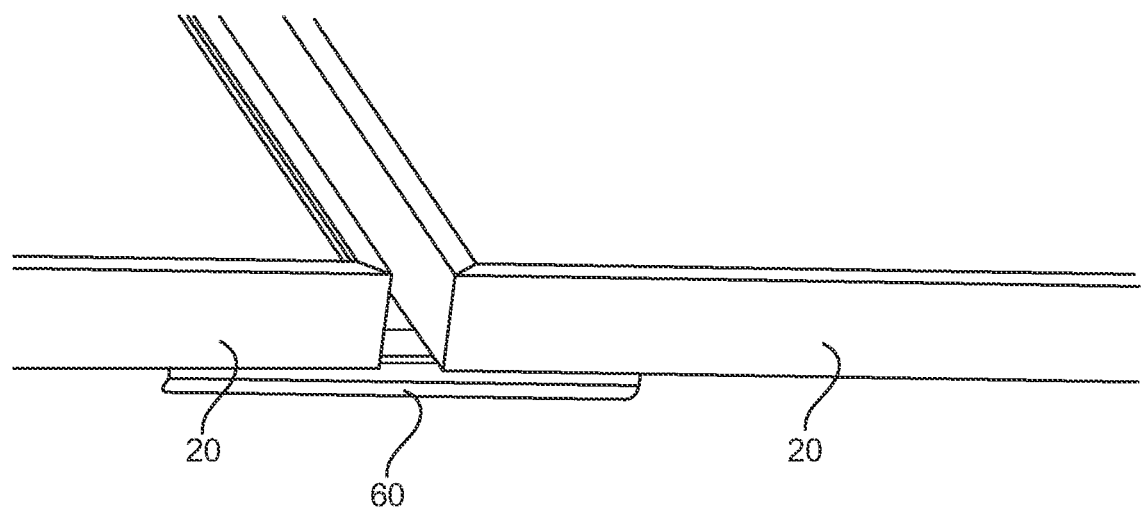
FIG. 11A is a perspective view showing the placement of the lateral bonding clip between two adjacent solar module frames.
Figure 11B:
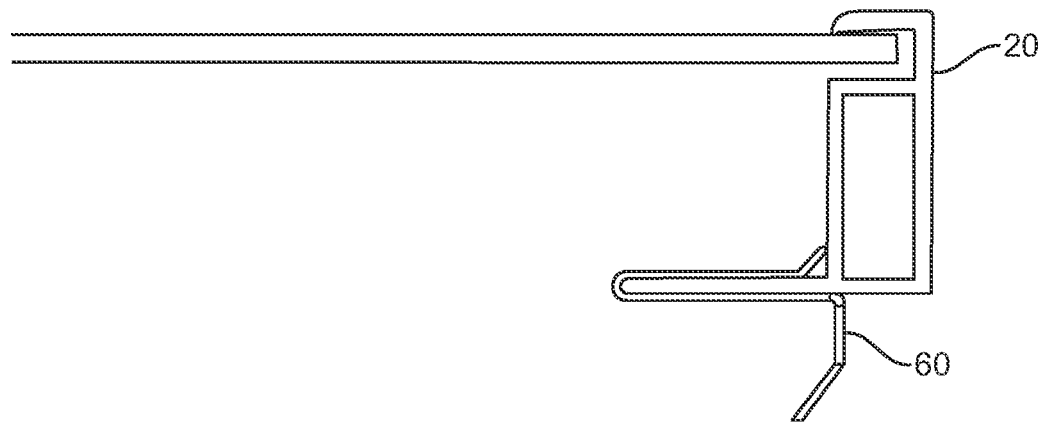
FIG. 11B is a side elevation view corresponding to FIG. 11A.
Figure 11C:
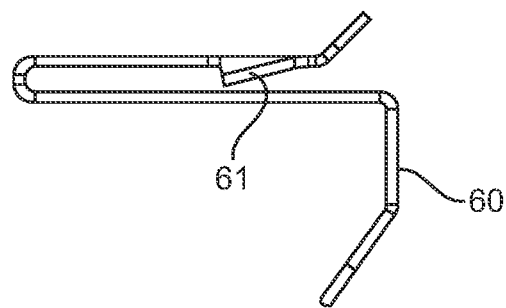
FIG. 11C is a side elevation view of an embodiment of the lateral bonding clip having a sharp grounding barb thereon.
Figure 11D:
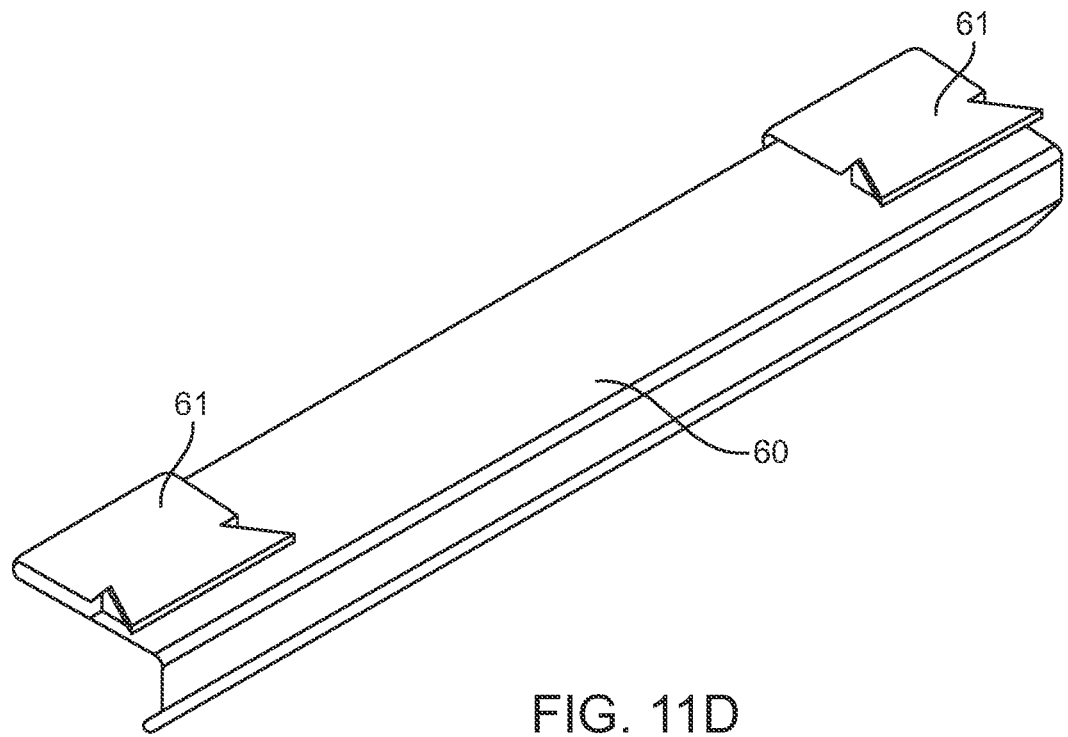
FIG. 11D is a perspective view of the lateral bonding clip of FIGS. 11A to 11C.
Figure 11E:
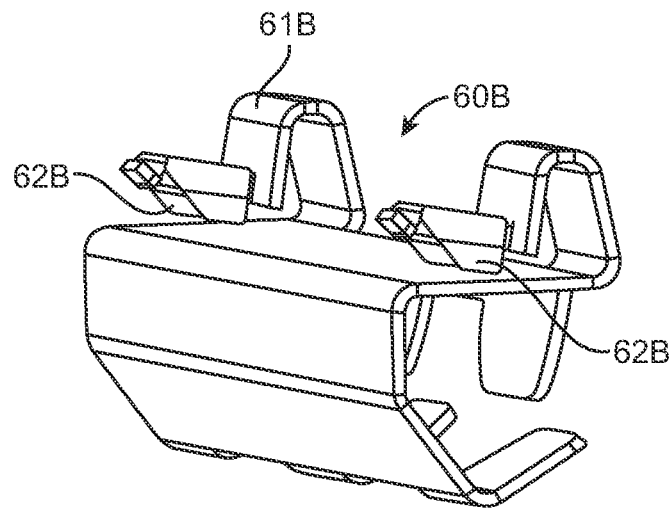
FIG. 11E is a perspective view of an alternate lateral bonding clip.
Figure 11F:
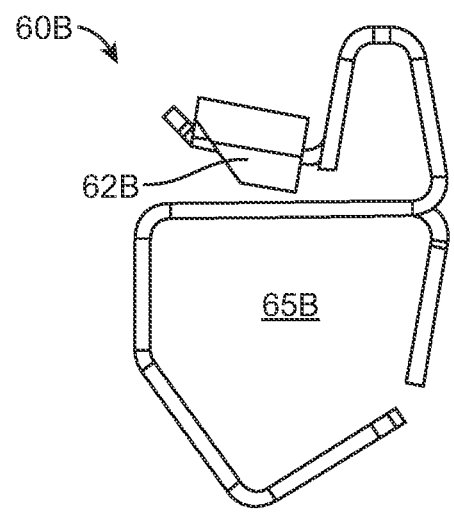
FIG. 11F is a side elevation view of the lateral bonding clip of FIG. 11E.
Figure 11G:
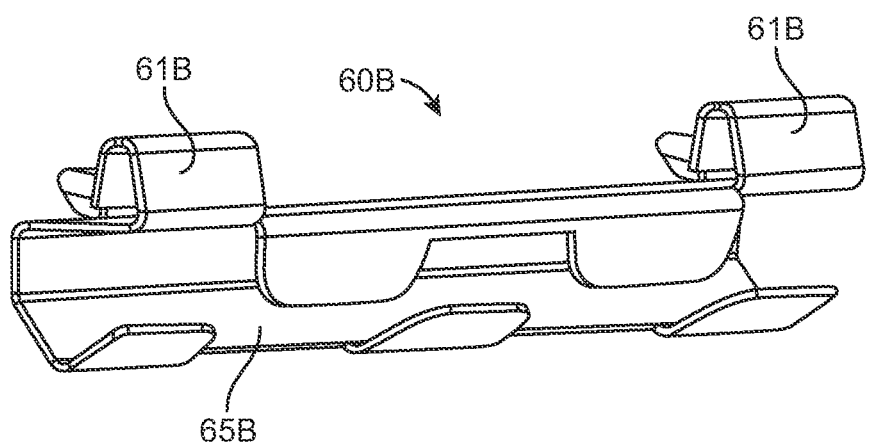
FIG. 11G is a rear perspective view of the lateral bonding clip of FIGS. 11E and 11F.

FIGS. 11E to 11G are views of an alternate lateral bonding clip 60B. Lateral bonding clip 60B has flexible portions 61B in which grounding barbs 62B are mounted. This bonding clip 60B is shaped to accommodate thermal expansion and contraction. In various optional embodiments, the bounding clip may be formed with an optional wire management channel 65B.

Figure 11H:
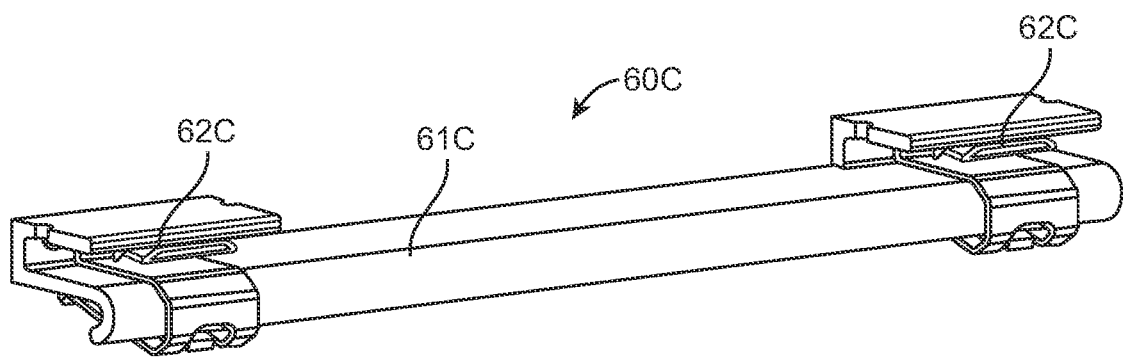
FIG. 11H is a perspective view of an alternate bonding clip.
Figure 11I:
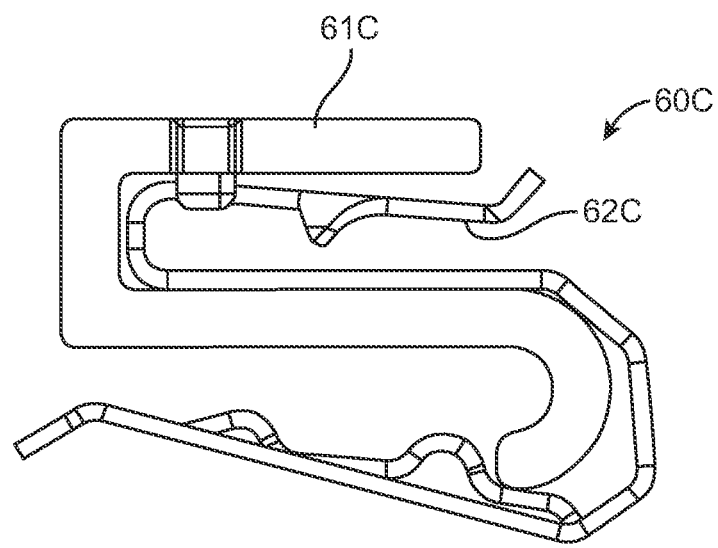
FIG. 11I is a side elevation view of the bonding clip of FIG. 11H.

FIGS. 11H and 11I are views of an alternate two-piece bonding clip 60C. Bonding clip 60C is formed from a member 61C (which may optionally be an aluminum extrusion), and two clips 62C. Clips 62C preferably slide with thermal expansion and contraction such that they scratch through the PV module frame anodization.

Figure 12A:
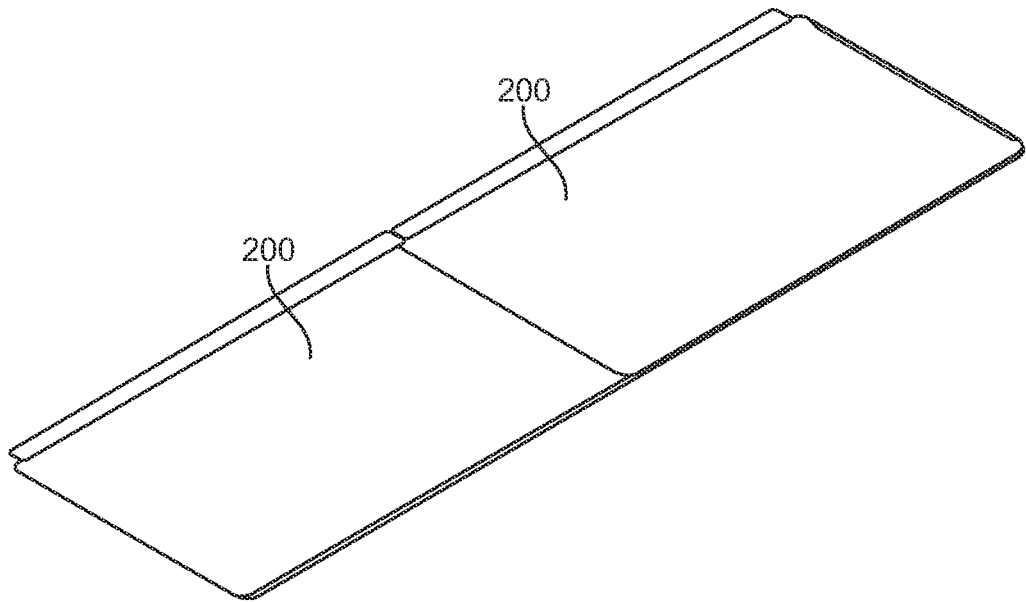
FIG. 12A is a perspective view of a pair of interlocking shingles.
Figure 12B:
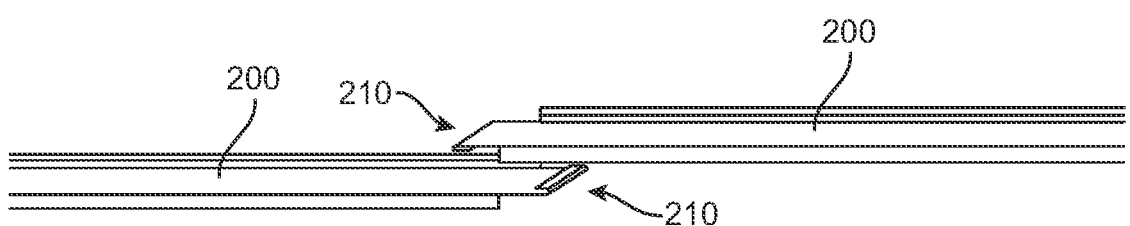
FIG. 12B is a view corresponding to FIG. 12A, showing the overlapping and interlocking edges of the shingles.

FIGS. 12A and 12B are perspective views of a pair of adjacent shingles 200 having overlapping edges, one with a feature such as a hem to create a space for water to drain out 210. Overlapping side edges 210 provide resistance to wind driven rain and enable fast installation.

Figure 13A:
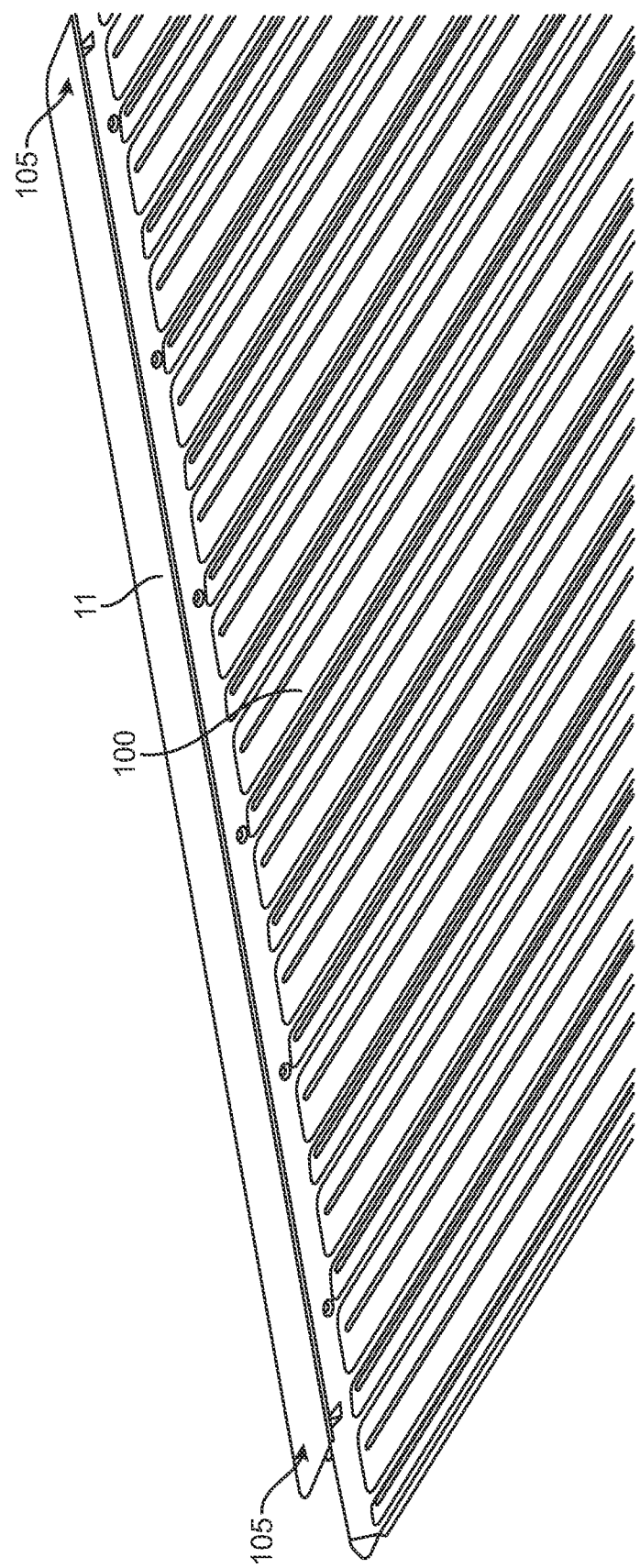
FIG. 13A is a perspective view of a corrugated shingle having a pair of grounding barbs.
Figure 13B:
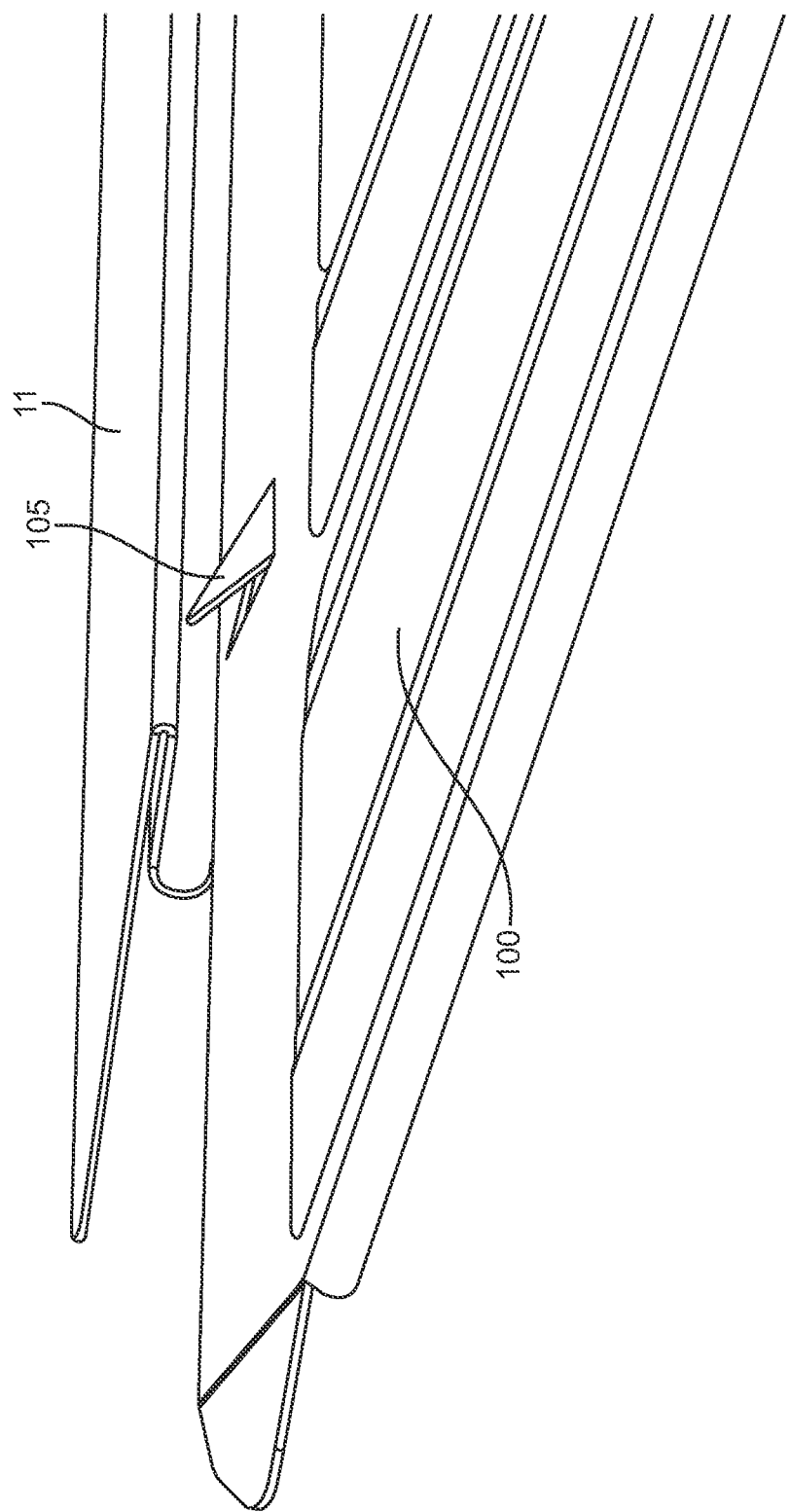
FIG. 13B is a close-up view of one of the grounding barbs.
Figure 13C:
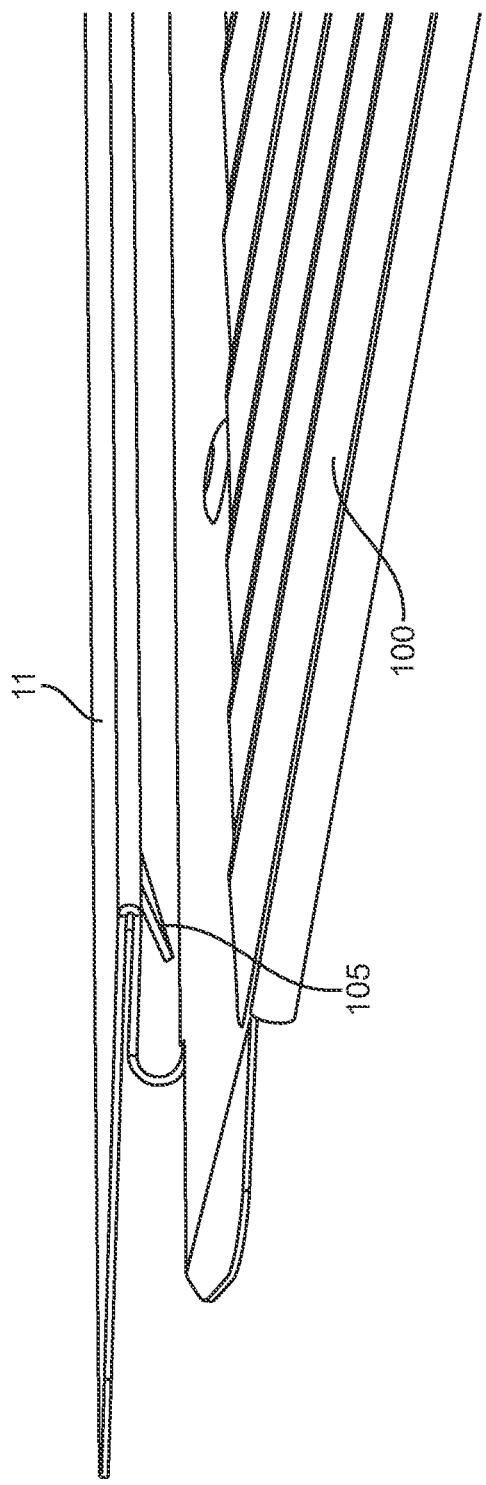
FIG. 13C is similar to FIG. 13B, but the grounding barb is instead underneath the nail strip portion of the shingle.
Figure 13D:
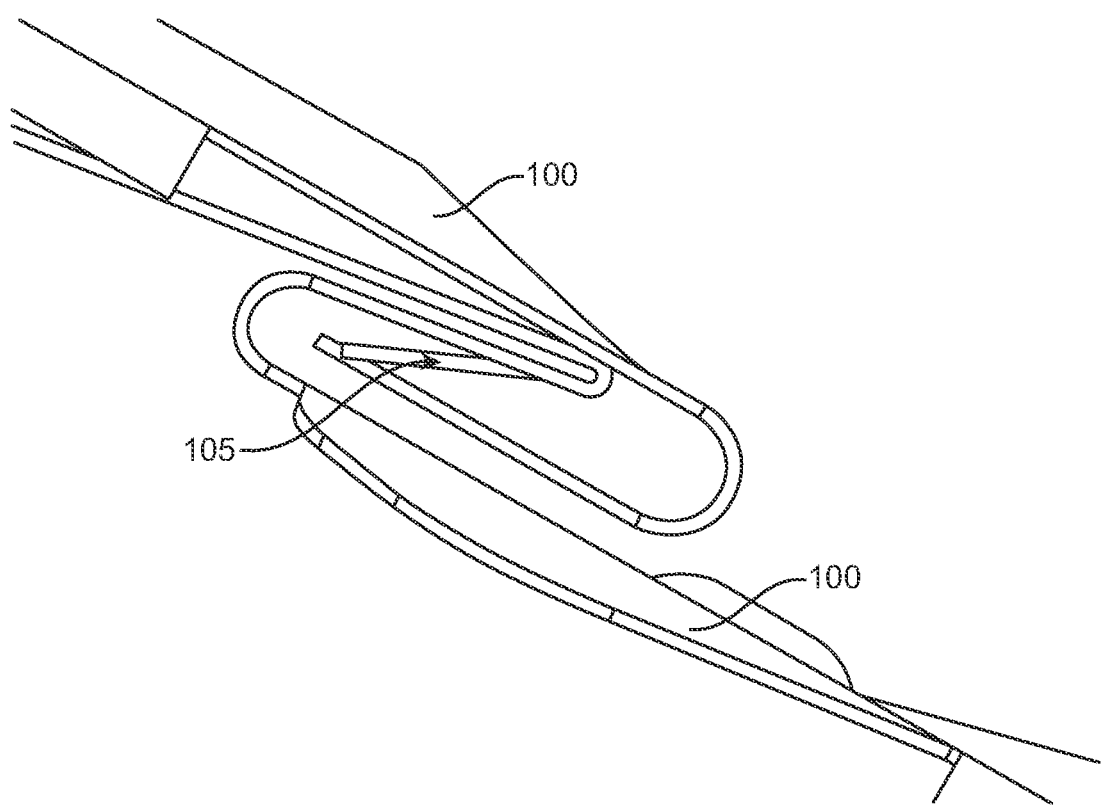
FIG. 13D is a side elevation close-up view corresponding to FIG. 13C.

FIGS. 13A and 13B are views of a corrugated shingle 100 having a pair of grounding barbs 105. FIG. 13C is similar to FIG. 13B, but the grounding barb 105 is instead underneath the nail strip portion 11 of the shingle. FIG. 13D illustrates how grounding barb 105 makes electrical contact between upper and lower shingles 10, thereby providing top to bottom grounding of the metal shingles on the roof.

Figure 14A:
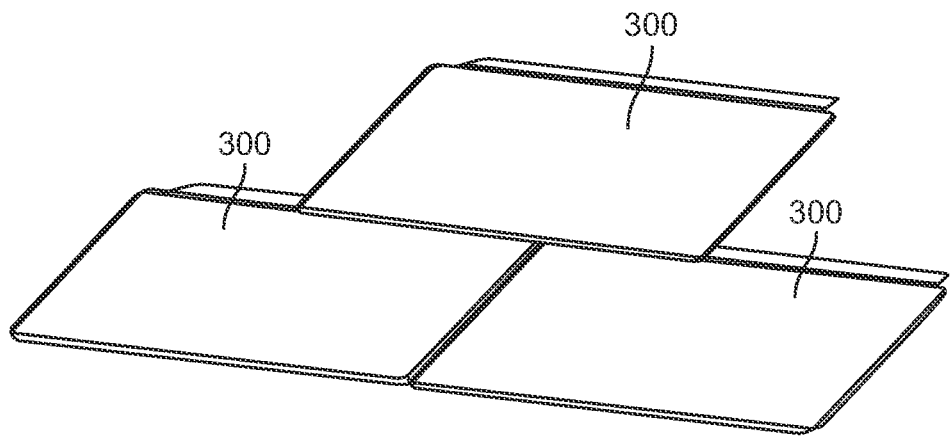
FIG. 14A illustrates three shingles with interlocking edges.
Figure 14B:
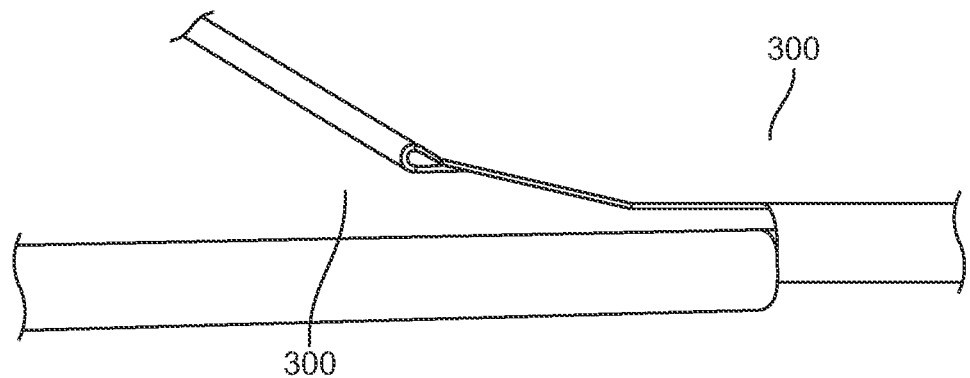
FIG. 14B illustrates a perspective view of the front sidelap interface of the three shingles of FIG. 14A.
Figure 14C:
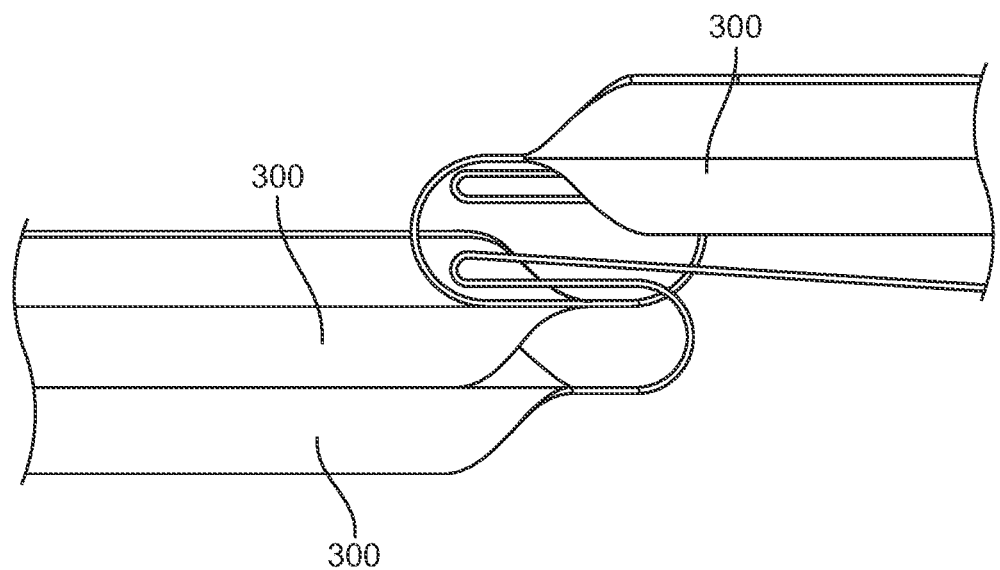
FIG. 14C illustrates the assembly of the three shingles of FIGS. 14A and 14B, showing a right-up hem and a left-down hem with a sidelap.

FIG. 14A illustrates three shingles 300 with interlocking edges. FIG. 14B illustrates a perspective view of the front sidelap interface of the three shingles of FIG. 14A. FIG. 14C illustrates the assembly of the three shingles of FIGS. 14A and 14B, showing a right-up hem and a left-down hem with a sidelap. In accordance with this aspect of the present system, two of the shingles correspond to the down-roof edge (left), and one corresponds to the up-roof edge. In accordance with the present system, the hems of the shingles are sized in order to capture the upper cleat of the two lower shingles which are not colinear.

Figure 15A:
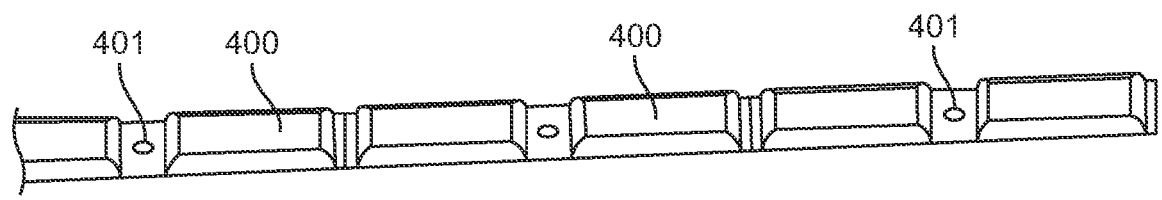
FIG. 15A is a perspective view of a plurality of optional fire suppression packets.
Figure 15B:
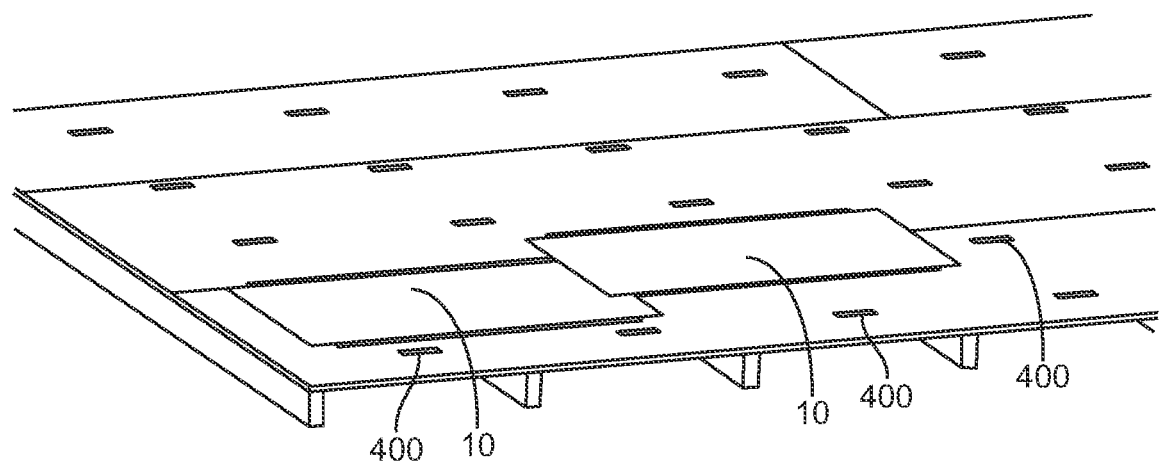
FIG. 15B is a perspective view showing an example of placement of the fire suppression packets of FIG. 15A.

FIGS. 15A and 15B show a plurality of optional fire suppression packets 400. Preferably, fire suppression packets 400 are manufactured in a short roll as illustrated. Packets 400 have a nail able area 401. Packets 400 are preferably placed under shingles 10 and may be strategically positioned over weak spots such as over gaps between plywood. Packets 400 may optionally be made from a polymer film (TPO, polyethylene, EPDM, etc.) with pockets (like bubble wrap, etc.) filled with a fire suppressant material such as magnesium hydroxide or ferrous sulfate heptahydrate, or they may be a solid composite of co extruded polymer and fire suppression material.

Figure 16:
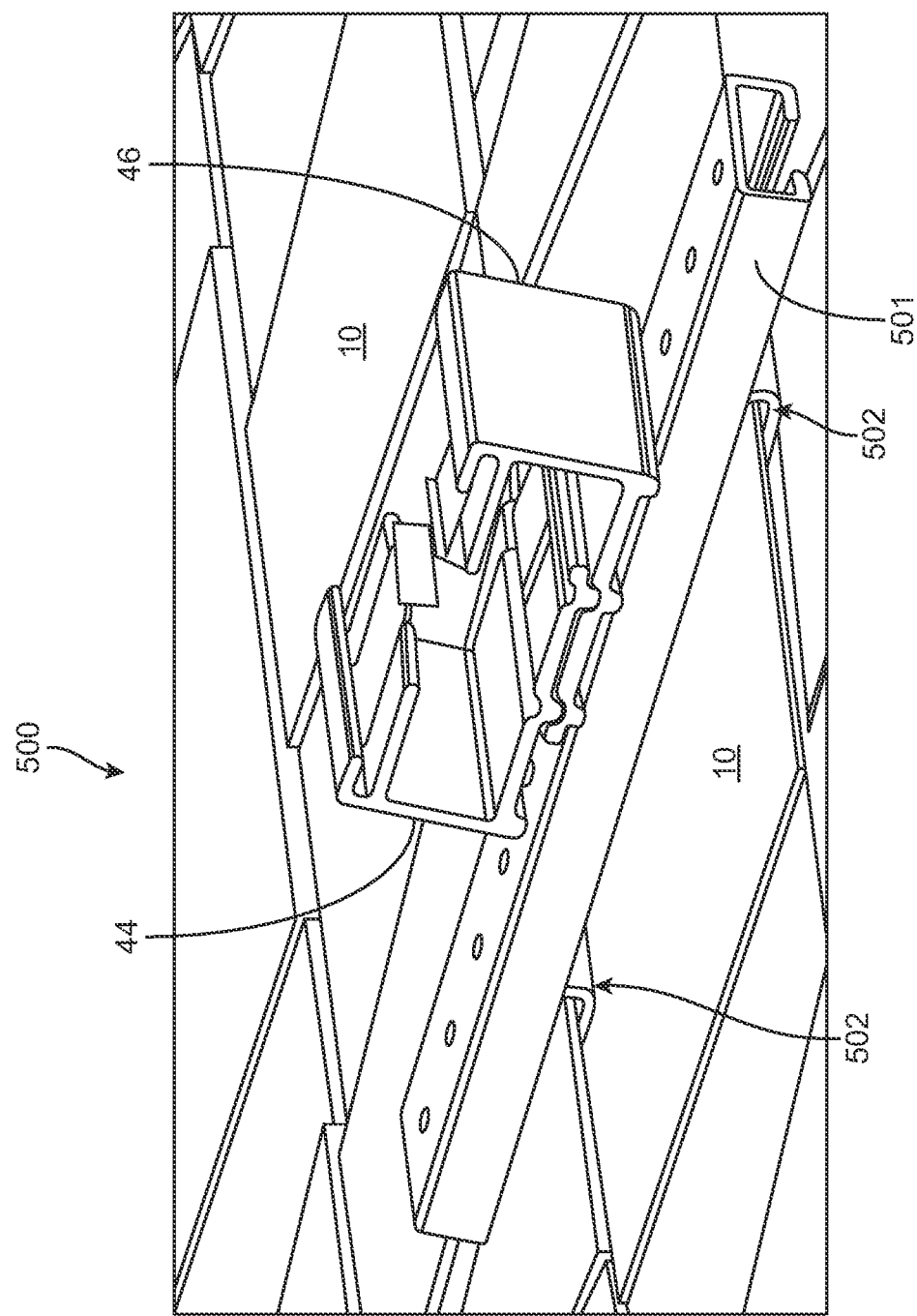
FIG. 16 is a perspective view of an optional "under the shingle" mounting assembly.

FIG. 16 is a perspective view of an optional "under the shingle" mounting assembly 500. Mounting assembly 500 has a member 501 that is attached to clips 502. Clips 502 have edges (not shown) that are received under metal shingles 10. As such, the present system can provide a mounting assembly 500 that does not require penetrations be made through shingles 10. Member 501 is preferably a C-shaped channel that provides munting flexibility in the up-down direction on the roof. Member 501 can be as short as a single shingle height, or alternately span across the lengths of several shingle lengths.

Figure 17B:
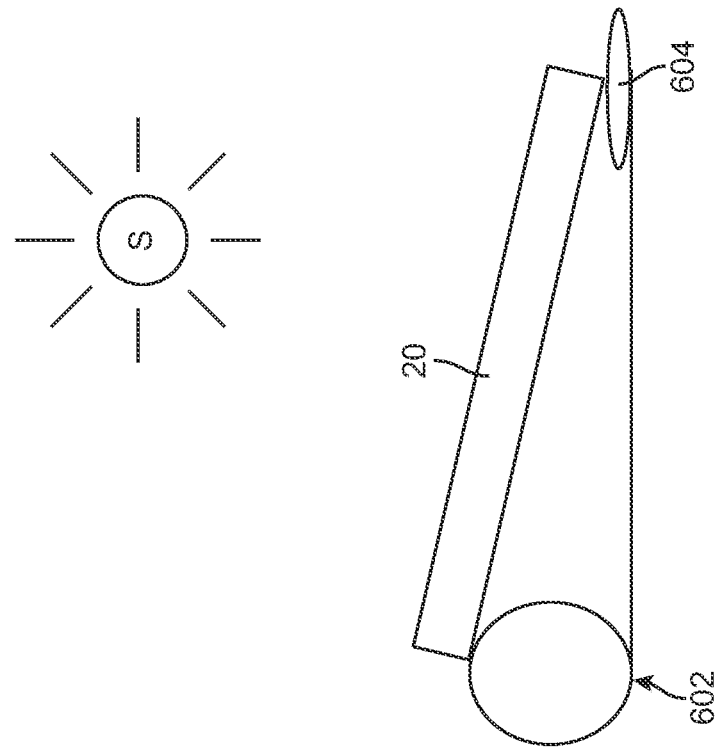
FIG. 17B corresponds to FIG. 17A, but the solar module has been lifted to a second position.
Figure 17A:
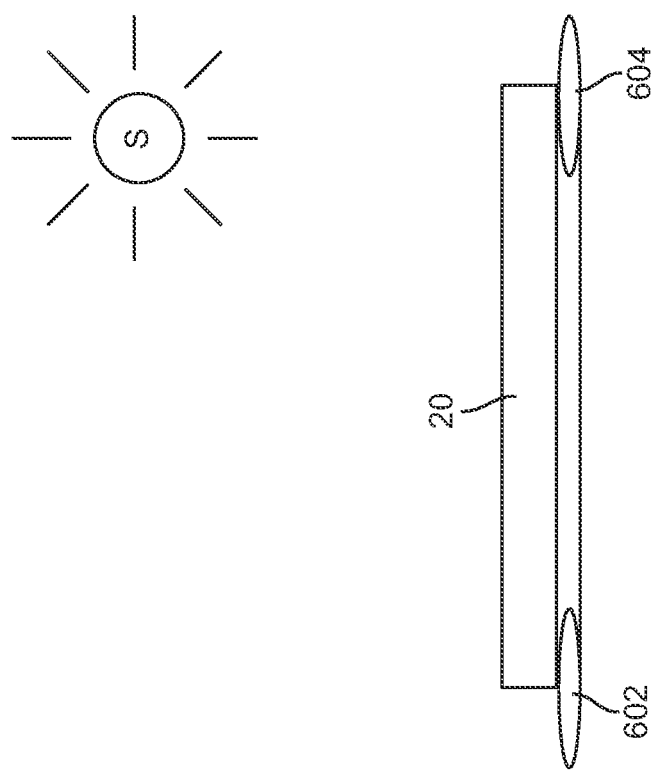
FIG. 17A is a side elevation view of an optional inflatable system for positioning a solar module (shown in a first position).

FIG. 17A is a side elevation view of an optional inflatable system for positioning a solar module (shown in a first position). FIG. 17B corresponds to FIG. 17A, but the solar module has been lifted to a second position. In this optional aspect of the present system, inflatable tubes 602 and 604 are mounted under PV module 20. Preferably, inflatable tubes 602 and 604 are made of a flexible material such as TPO or EPDM. By inflating (or deflating with air or a hydraulic fluid) tubes 602 and 604, the direction in which PV module 20 faces can be changed. For example, tube 602 can be inflated (FIG. 17B) such that PV module 20 better faces the sun S. Another advantage of inflatable tube 602 and 604 is that they provide cushioning support in the advent of hail.

FIGS. 18A to 18C illustrate an alternate "under the shingle" mounting fastener 700 which is attached to a shingle 10 with its flattened end 701 received under the edge of one of the shingles 10.

Figure 19:
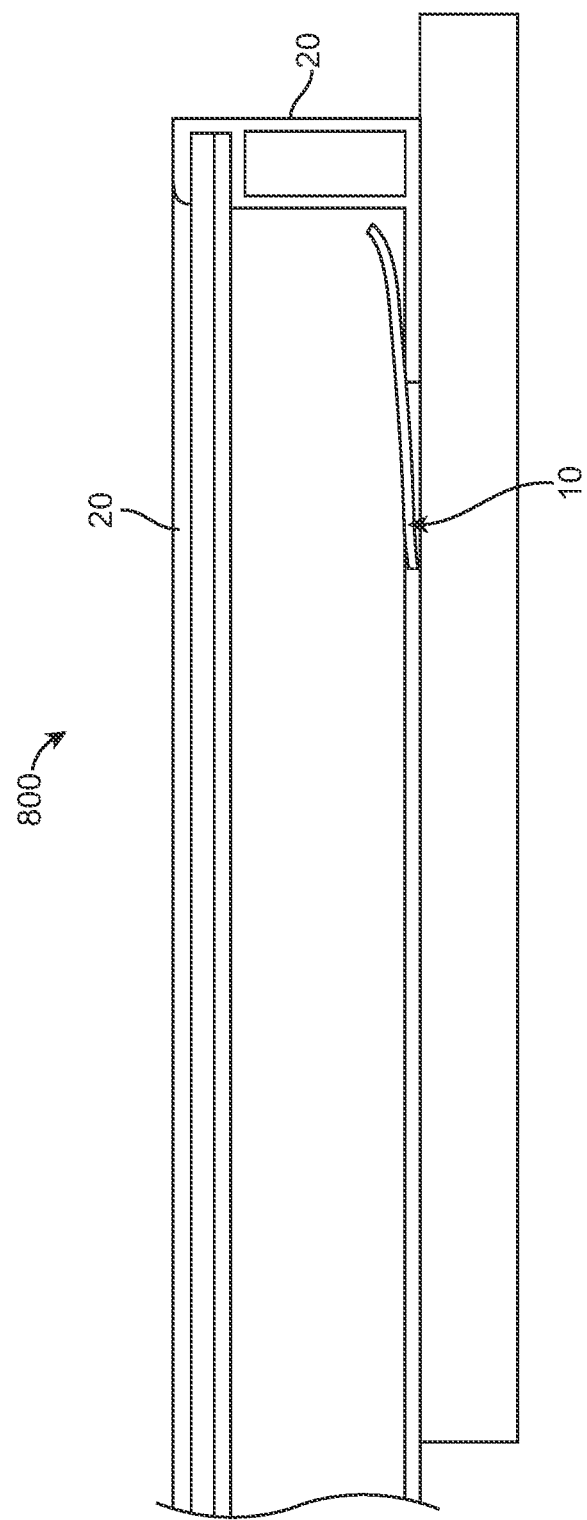
FIG. 19 is a side elevation view of a single ply roof integrated mounting cleat.

FIG. 19 is a side elevation view of a single ply roof integrated mounting cleat system 800. Specifically, a cleat is pre-attached or field attached to the TPO, EPDM, or other single ply roof membrane. The frame 20 is then slipped onto the cleat. Optionally, the cleats can be integrated into the rolls of roofing material (e.g.: TPO or EPDM) prior to install. The roofing material is then rolled out, welded at the seams, fastened per typical means, and solar panels are dropped on top and clipped into place. Metal clips may be riveted on, sewn in, or captured between two welded pieces.

Figure 20A:
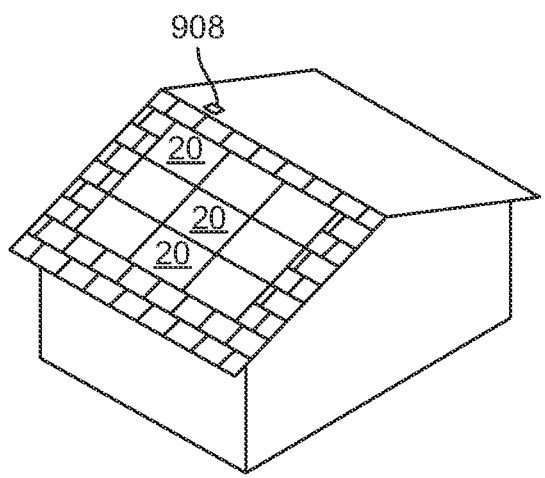
FIG. 20A is a perspective view of a building with a solar array thereon with attic vents installed under the solar array.
Figure 20B:
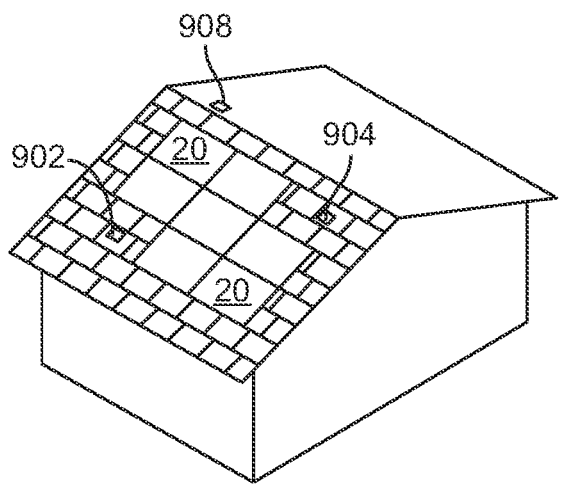
FIG. 20B is a view corresponding to FIG. 20A, but with two solar modules removed so the attic vents can be seen.
Figure 20C:
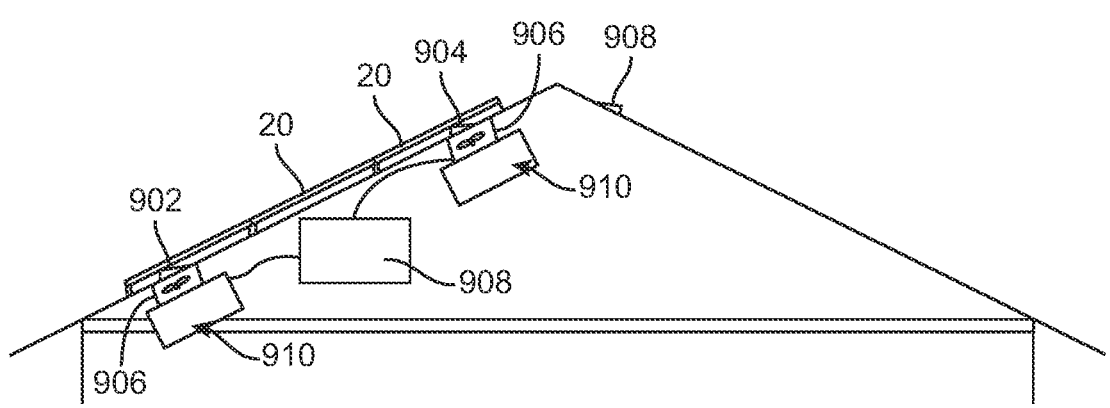
FIG. 20C is a sectional side elevation view corresponding to FIG. 20A.

FIGS. 20A to 20C show a building with a solar array thereon with attic vents 902 and 904 installed under the solar array. Attic fans 906 can be positioned adjacent to vents 902 and 904 as shown. A control system 908 operates fans 906. Control system 908 preferably also includes temperature and humidity sensing capabilities. A phase change or desiccant material 910 can optionally be positioned adjacent to fans 906. The desiccant material may optionally be MgSO4, or any other suitable material. In operation, fans 906 and be operated to pull air into the building attic or to push building air out of the attic through vents 902 and 904. As such, fans 906 can preferably be operated to pass air in both directions. The advantage of fans 906 is that they can assist in heating the building by pulling in outside air warmed by the PV array. Conversely, fans 906 can be used to cool the building by pushing warm attic air out of the building and across the underside of the PV array. An additional vent 908 permits moisture and temperature management of the building envelope. Fans 906 are preferably independently operable and reversible. Being reversible, fans 906 can selectively either bring in or expel building heat. The optional phase change material 910 can act as a thermal reservoir to manage solar and building envelope conditions. As such, the PV array itself operates as a heat pump for the building envelope. In optional approaches, when the temperature of PV and the attic are high and the moisture capacity of desiccant 910 is high, the present system will draw air from attic and blow it across the PV modules in order to reduce their temperatures.

What is claimed is:

1. A system for aligning and grounding an array of solar modules above a metal shingled roof while permitting thermal expansion and contraction of each of the individual solar modules in the array, comprising:
   a metal shingled roof;
   an array of solar modules;
   an array of solar mounting assemblies distributed across the metal shingled roof, wherein each solar mounting assembly in the array comprises grounding clips configured to ground an upper solar module to a lower solar module while permitting the upper and lower solar modules to thermally expand and contract; and
   an array of lateral bonding clips, wherein each lateral bonding clip in the array grounds and aligns a pair of laterally adjacent solar modules to one another while permitting the laterally adjacent solar modules to thermally expand and contract,
   wherein each solar mounting assembly in the array comprises:
      a base,
      an upper solar module cleat mounted onto the base, the upper solar module cleat being configured to support a lower end of an upper solar module, and
      a lower solar module cleat mounted onto the base, the lower solar module cleat being configured to support an upper end of a lower solar module,
      and wherein the grounding clips are in electrical contact with upper and lower module cleats.

2. The system of claim 1, wherein the upper and lower solar module cleats flex towards and away from one another as the solar modules thermally expand and contract.

3. The system of claim 1, wherein each solar module in the array is supported by a solar module frame.

4. The system of claim 1, wherein each lateral bonding clip comprises an elongated member dimensioned to be positioned against both of the laterally adjacent solar module frames, thereby holding the laterally adjacent solar module frames in alignment with one another.

5. The system of claim 4, wherein each lateral bonding clip is received around a flange on a frame supporting each of the adjacent solar modules.

6. The system of claim 4, wherein the lateral bonding clips only touch solar module frames that support the laterally adjacent solar modules.

7. The system of claim 1, wherein the grounding clips ground the solar module frames in the array in an up/down direction on the roof and the lateral bonding clips ground the solar modules in the array in a left/right direction on the roof.

8. The system of claim 1, wherein the metal shingled roof comprises shingles having capillary breaks therebetween.

9. The system of claim 1, wherein the metal shingled roof comprises shingles that are sized to be integer divisions of the size of the solar module frames in the array.

10. The system of claim 1, wherein the metal shingled roof comprises shingles that are indexed to display locations for the positioning of the solar mounting assemblies thereon.

11. The system of claim 1, wherein the metal shingled roof comprises shingles that are indexed to display locations for setting adjacent rows of shingles thereover.

12. The system of claim 1, wherein the lateral bonding clip further comprises a wire management channel.

13. The system of claim 4, wherein each lateral bonding clip comprises a pair of grounding barbs, and wherein a first grounding barb is in contact with a first laterally adjacent solar module frame and the second grounding barb is in contact with a second laterally adjacent solar module frame.

14. The system of claim 13, wherein the pair of grounding barbs are disposed at opposite ends of the elongated member.

15. The system of claim 13, wherein installation of the adjacent solar module frames causes the frames to slide across the barbs, thereby scratching through anodization on the laterally adjacent solar module frames.

16. The system of claim 13, wherein each lateral bonding clip has flexible portions in which the grounding barbs are mounted.

17. A system for aligning and grounding an array of solar modules above a metal shingled roof while permitting thermal expansion and contraction of each of the individual solar modules in the array, comprising:
   a metal shingled roof;
   an array of solar modules;
   an array of solar mounting assemblies distributed across the metal shingled roof, wherein each solar mounting assembly in the array comprises grounding clips configured to ground an upper solar module to a lower solar module while permitting the upper and lower solar modules to thermally expand and contract; and
   an array of lateral bonding clips, wherein each lateral bonding clip in the array grounds and aligns a pair of laterally adjacent solar modules to one another while permitting the laterally adjacent solar modules to thermally expand and contract
   wherein each lateral bonding clip comprises a pair of grounding barbs, and wherein a first grounding barb is in contact with a first laterally adjacent solar module frame and the second grounding barb is in contact with a second laterally adjacent solar module frame, and wherein each of the grounding barbs are slidable along a length of the longitudinally extending member such that the grounding barbs move with respect to one another.

18. The system of claim 17, wherein the grounding barbs are disposed in clips that are slidable along the length of the longitudinally extending member.

19. A roofing system for attaching a solar module array onto a metal shingled roof, comprising:
   a plurality of metal shingles, wherein each metal shingle comprises:
      a rectangular body,
      a nail strip running along a top edge of the rectangular body,
      an overlapping side edge extending down a left side of the rectangular body,
      an overlapping side edge extending down a right side of the rectangular body,
      overlapping raised portions adjacent to each of the overlapping side edges, and
      indicia marks on the rectangular body, wherein the indicia marks provide alignment between rows of shingles in both side-to-side and up-and-down directions, and
   wherein each metal shingle is symmetrical in a left-to-right direction, and is symmetrical about a central plane perpendicular to a roof on which the metal shingle is mounted.

20. The roofing system of claim 19, wherein the plurality of metal shingles can be installed in either a left to right direction on a roof or in a right to left direction on the roof with the left overlapping side edge of a first metal shingle mating with the right overlapping side edge of a second metal shingle.

21. The roofing system of claim 20, wherein the left overlapping side edge of a first metal shingle mates with the right overlapping side edge of a second metal shingle to provide a block for wind driven rain.

22. The roofing system of claim 19, wherein the indicia marks indicate positions for installing an array of solar mounting assemblies on the roof.

23. The roofing system of claim 19, further comprising:
   features formed on the rectangular body that form capillary breaks between successive rows of overlapping metal shingles.

24. The roofing system of claim 23, wherein the features formed on the rectangular body are stamped or grooved lines on the rectangular body.

25. The roofing system of claim 19, wherein the indicia are lines parallel to the side edges of the rectangular body.

\* \* \* \* \*